(12) United States Patent
Wang et al.

(10) Patent No.: US 10,372,960 B2
(45) Date of Patent: Aug. 6, 2019

(54) CAPACITANCE DETECTING SENSORS AND RELATED DEVICES AND SYSTEMS

(71) Applicant: Shenzhen Goodix Technology Co., Ltd., Shenzhen (CN)

(72) Inventors: Chung-Yi Wang, Taipei (TW); Meng-Ta Yang, Taipei (TW)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/333,005

(22) Filed: Oct. 24, 2016

(65) Prior Publication Data

US 2017/0116452 A1     Apr. 27, 2017

Related U.S. Application Data

(60) Provisional application No. 62/245,932, filed on Oct. 23, 2015.

(51) Int. Cl.
*G06K 9/00*     (2006.01)
*G06F 3/044*    (2006.01)

(52) U.S. Cl.
CPC ............ *G06K 9/0002* (2013.01); *G06F 3/044* (2013.01)

(58) Field of Classification Search
CPC .................................................. G06K 9/0002
See application file for complete search history.

(56) References Cited

U.S. PATENT DOCUMENTS 6,356,085 B1 * 3/2002 Ryat ................... G01R 27/2605
324/607
2009/0102780 A1 4/2009 Brown
(Continued)

FOREIGN PATENT DOCUMENTS

CN     101405639 A     4/2009
CN     101526988 A     9/2009
(Continued)

OTHER PUBLICATIONS

European Search Report dated Feb. 7, 2018 for European Application No. 16856955.6, filed Oct. 24, 2016 (8 pages).
(Continued)

*Primary Examiner* — David F Dunphy
(74) *Attorney, Agent, or Firm* — Perkins Coie LLP

(57) ABSTRACT

Capacitance detecting circuit is disclosed for fingerprint sensing and other applications. The capacitance detecting circuit includes a first capacitor, an integrator, a second capacitor, a comparator, and a counter. The integrator can generate an integrating output voltage and includes a first single-ended amplifier and at least one integration capacitor. The first single-ended amplifier includes a first input terminal and an integrating output terminal. The comparator can generate a comparing output and include a negative input terminal coupled to the integrating output terminal of the first single-ended amplifier, a positive input terminal to receive a reference voltage, and a comparing output terminal to output the comparing output voltage. The counter is coupled to the comparing output terminal and can generate a counter output. A connection between the second capacitor and the first input terminal is controlled to be conducted or cutoff according to the comparing output.

53 Claims, 27 Drawing Sheets

(56) References Cited

U.S. PATENT DOCUMENTS

| | | | |
|---|---|---|---|
| 2014/0176482 A1* | 6/2014 | Wei | G06F 3/044 |
| | | | 345/174 |
| 2015/0130648 A1 | 5/2015 | Krauss | |
| 2015/0338952 A1* | 11/2015 | Shahparnia | G06F 3/044 |
| | | | 345/174 |
| 2015/0379255 A1* | 12/2015 | Konanur | G06F 21/35 |
| | | | 726/19 |
| 2017/0255808 A1* | 9/2017 | Hsu | G06K 9/0002 |

FOREIGN PATENT DOCUMENTS

| | | |
|---|---|---|
| CN | 101556297 A | 10/2009 |
| CN | 101655524 A | 2/2010 |
| CN | 201607715 U | 10/2010 |
| CN | 10210344 A | 6/2011 |
| CN | 203117298 U | 8/2013 |
| CN | 103487662 A | 1/2014 |
| CN | 103902114 A | 7/2014 |
| DE | 10 2013 222 252 A1 | 4/2015 |

OTHER PUBLICATIONS

International Search Report and Written Opinion dated Feb. 4, 2017 for International Application No. PCT/CN2016/103074, filed Oct. 24, 2016 (8 pages).
Office Action dated Feb. 27, 2019 for CN Application No. 201680003677.8.

* cited by examiner

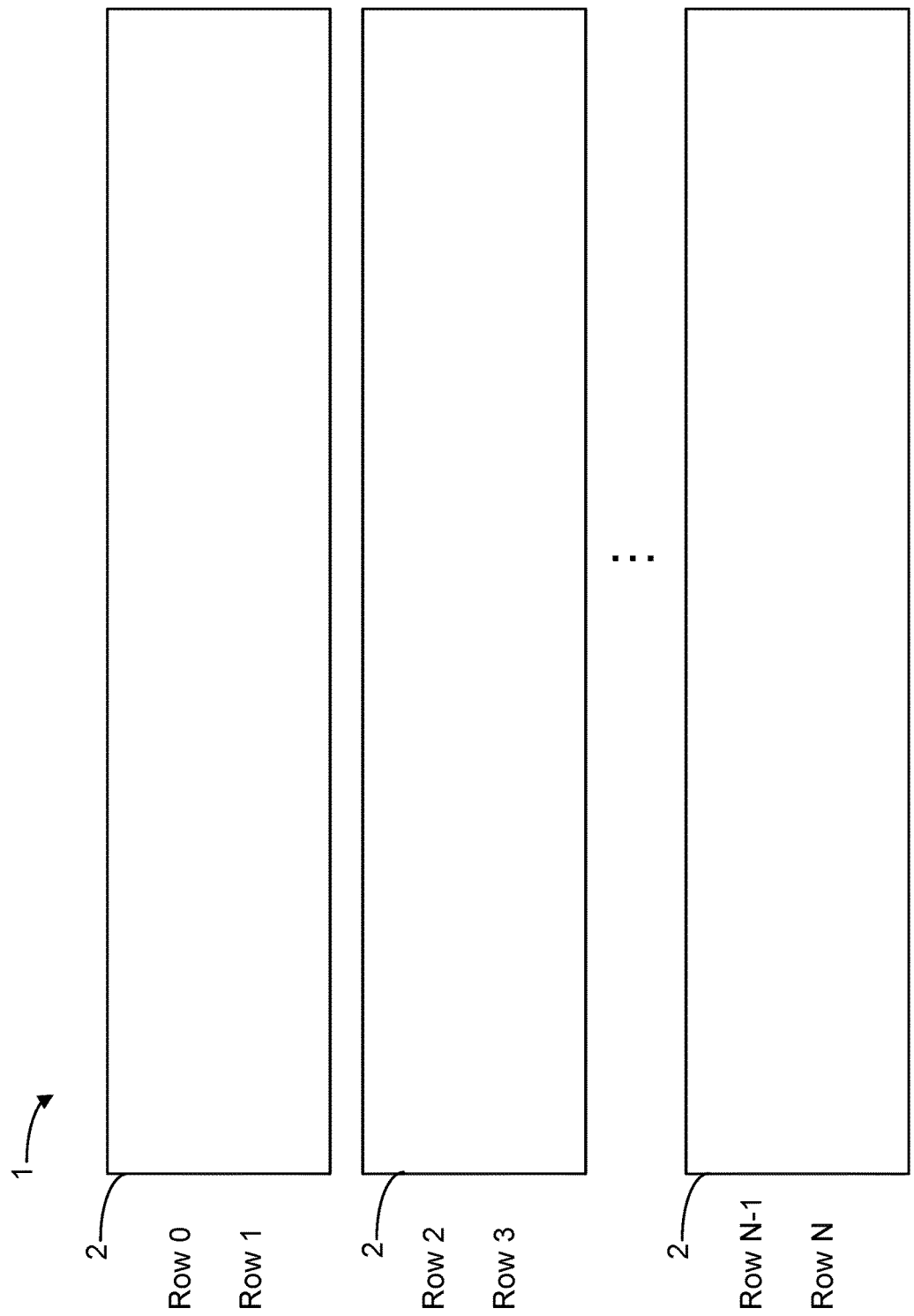

CAPACITANCE DETECTING SENSORS AND RELATED DEVICES AND SYSTEMS

CROSS REFERENCE TO RELATED APPLICATIONS

This patent document claims the benefit of priority of U.S. Provisional Patent Application No. 62/245,932, filed on Oct. 23, 2015. The entire content of the before-mentioned patent application is incorporated by reference as part of the disclosure of this document.

TECHNICAL FIELD

The present disclosure generally relates to capacitance detecting circuitry applicable in devices and systems with fingerprint recognition for securely accessing a device such as a mobile device or a system such as an electronic database and a computer-controlled system.

BACKGROUND

With the development of technology, there is an increasing need for securing access to computers and computer-controlled devices or systems where only authorized users be identified and be distinguished from non-authorized users. For example, mobile phones, digital cameras, tablet PCs, notebook computers and other portable electronic devices have become more and more popular in personal, commercial and governmental uses. As a specific example, portable electronic devices for personal use should be equipped with security to protect the user's privacy. In another example, a computer or a computer-controlled device or system for an organization or enterprise should be secured to allow only authorized personnel to access in order to protect the information or the use of the device or system for the organization or enterprise. The information stored in portable devices and computer-controlled databases, devices or systems, may be personal in nature, such as personal contacts or phonebook, personal photos, personal health information or other personal information, or confidential information for proprietary use by an organization or enterprise, such as business financial information, employee data, trade secrets and other proprietary information. If the security of the access to the electronic device or system is compromised, these data may be accessed by others, causing loss of privacy of individuals or loss of valuable confidential information. Beyond security of information, securing access to computers and computer-controlled devices or systems also allow safeguard the use of devices or systems that are controlled by computers or computer processors such as computer-controlled automobiles and other systems such as ATMs.

Security access to a device such as a mobile device or a system such as an electronic database and a computer-controlled system can be achieved in different ways such as use of user passwords. A password, however, may be easily to be spread or obtained and this nature of passwords can reduce the level of the security. Moreover, a user needs to remember a password to use electronic devices or systems, and, if the user forgets the password, the user needs to undertake certain password recovery procedures to get authenticated or otherwise regain the access to the device and such processes may be burdensome to users and have various practical limitations and inconveniences. The personal fingerprint identification can be utilized to achieve the user authentication for enhancing the data security while mitigating certain undesired effects associated with passwords.

Electronic devices or systems, including portable or mobile computing devices, may employ user authentication mechanisms to protect personal or other confidential data and prevent unauthorized access. User authentication on an electronic device or system may be carried out through one or multiple forms of biometric identifiers, which can be used alone or in addition to conventional password authentication methods. One form of biometric identifiers is a person's fingerprint pattern. A fingerprint sensor can be built into the electronic device to read a user's fingerprint pattern so that the device or system can only be unlocked by an authorized user of the device or system through authentication of the authorized user's fingerprint pattern.

SUMMARY

Embodiments described in this document provide devices, systems, and techniques that perform capacitance detection applicable in touch sensing devices including human fingerprint detection and authentication for authenticating an access attempt to a locked computer-controlled device such as a mobile device or a computer-controlled system, that is equipped with a fingerprint detection module implementing capacitance detection circuitry. The capacitance detecting circuitry disclosed in this patent document is capable of constantly operating within a linear operating region of the circuit. The disclosed technology can be used for securing access to various electronic devices and systems, including portable or mobile computing devices such as laptops, tablets, smartphones, and gaming devices.

In one aspect, capacitance detecting circuit is disclosed. The capacitance detecting circuit can include a first capacitor, an integrator, a second capacitor, a comparator, and a counter. The first capacitor can be coupled to pixel sensing circuit. The integrator can be configured to generate an integrating output voltage and comprises a first single-ended amplifier and at least an integration capacitor. The first single-ended amplifier includes a first input terminal coupled to the first capacitor and an integrating output terminal configured to output the integrating output voltage. The comparator can be configured to generate a comparing output and include a negative input terminal coupled to the integrating output terminal of the first single-ended amplifier, a positive input terminal configured to receive a reference voltage, and a comparing output terminal configured to output the comparing output voltage. The counter is coupled to the comparing output terminal and configured to generate a counter output. A connection between the second capacitor and the first input terminal is controlled to be conducted or cutoff according to the comparing output.

In another aspect, a fingerprint identification system is disclosed. The fingerprint identification system includes a plurality of pixel sensing circuit, capacitance detecting circuit, and a fingerprint determining module. The capacitance detecting circuit is coupled to the plurality of pixel sensing circuit and configured to generate a plurality of capacitance outputs corresponding to the plurality of pixel sensing circuit. The capacitance detecting circuit includes a first capacitor, an integrator, a second capacitor, a comparator and a counter. The integrator is configured to generate an integrating output voltage and includes a first single-ended amplifier and at least an integration capacitor coupled to the first input terminal. The first single-ended amplifier includes an integrating output terminal configured to output the integrating output voltage and a first input terminal coupled to the first capacitor. The comparator is configured to generate a comparing output and includes a negative input terminal coupled to the integrating output terminal of the first single-ended amplifier, a positive input terminal configured to receive a reference voltage, and a comparing output terminal configured to output the comparing output. The counter is coupled to the comparing output terminal and configured to generate a plurality of counter outputs corresponding to the plurality of pixel sensing circuit as the plurality of capacitance outputs. The fingerprint determining module is coupled to the capacitance detecting circuit and configured to determine where each pixel sensing circuit located at is corresponding to a finger ridge or a finger valley according to the corresponding capacitance output. A connection between the second capacitor and the first input terminal is controlled to be conducted or cutoff according to the comparing output.

In another aspect a capacitance detecting circuit may include a first capacitor, coupled to a pixel sensing circuit, an integrator electrically coupled to the first capacitor and configured to generate an integrated output voltage. The integrator may include a first single-ended amplifier, including an integrating output terminal configured to output the integrated output voltage, and a first input terminal coupled to the first capacitor, and at least one integration capacitor coupled to the first input terminal. The integrator may further include an array of capacitors, one terminal of each capacitor in the array connected to the first input terminal, and the other terminal of each capacitor in the array being switched to a predetermined voltage or switched open. The integrator may also include a comparator coupled to the integrating output terminal of the first single-ended amplifier and configured to generate a comparing output voltage. The other terminal of each capacitor in the array of capacitors may be connected to a VDD switch to couple the other terminal to a voltage generator, and a ground switch to couple the other terminal to a ground. The VDD switch and the ground switch may be controlled to be ON when the comparing output indicates that the integrating output voltage is smaller than the reference voltage.

Various examples of capacitance detection circuit, fingerprint detection modules, and fingerprint sensor modules implementing the capacitance detection circuit described in this patent document can be integrated with mobile devices (e.g., smartphones, tablets, laptops), computing devices (e.g., personal computers), and other electronic devices to perform fingerprint authentication processes on these devices.

The above and other features and their implementations are described in greater detail in the attached drawings, the description and the claims.

BRIEF DESCRIPTION OF THE DRAWINGS

FIG. 1B is a block diagram of rows of first capacitance detecting circuits, in accordance with some example embodiments;

DETAILED DESCRIPTION

Figure 1A:
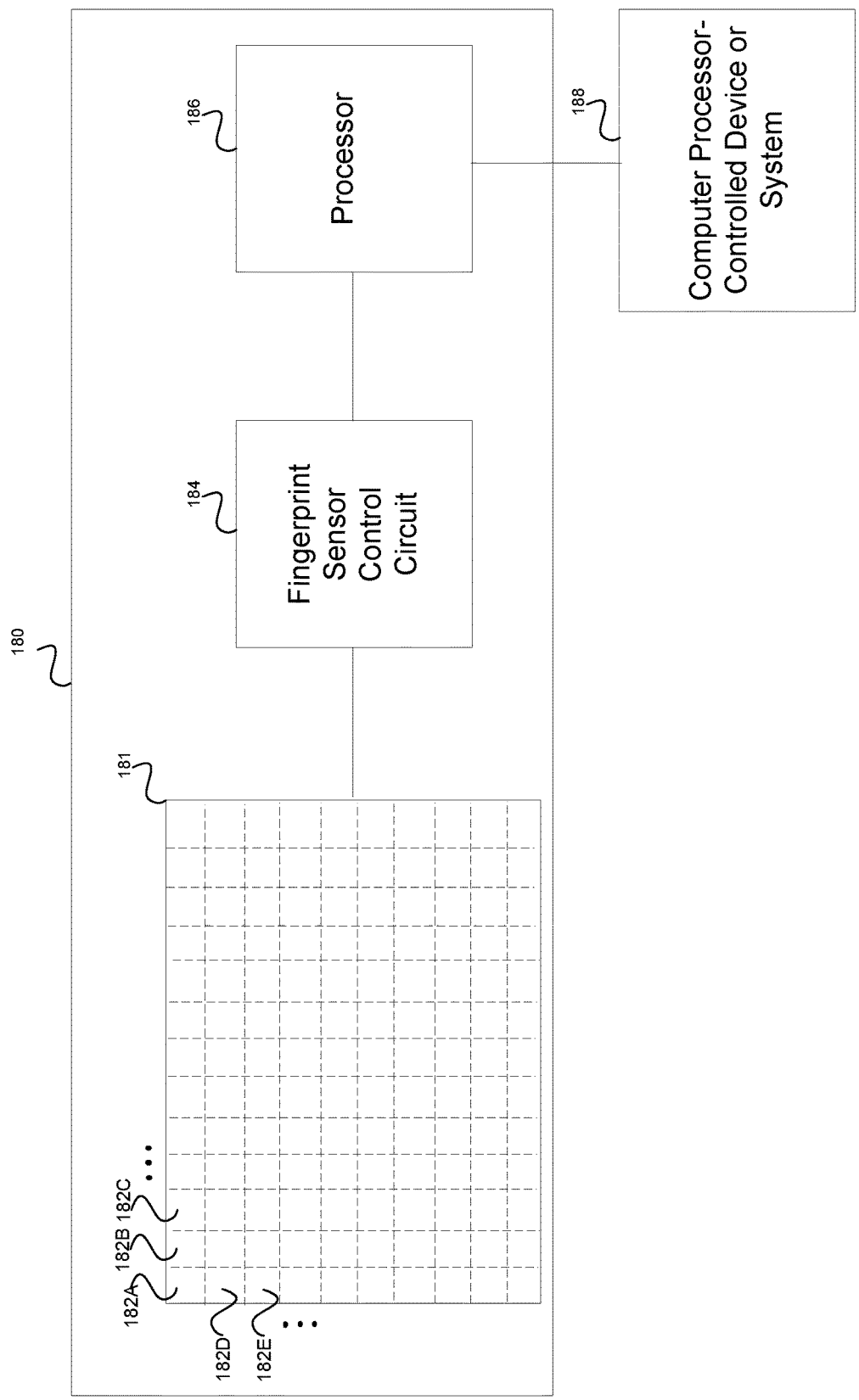
FIG. 1A is a block diagram of a fingerprint sensing system, in accordance with some example embodiments

Electronic devices or systems may be equipped with fingerprint authentication mechanisms to improve the security for accessing the devices. Such electronic devices or system may include, portable or mobile computing devices, e.g., smartphones, tablet computers, wrist-worn devices and other wearable or portable devices, larger electronic devices or systems, e.g., personal computers in portable forms or desktop forms, ATMs, various terminals to various electronic systems, databases, or information systems for commercial or governmental uses, motorized transportation systems including automobiles, boats, trains, aircraft and others.

However, the secured or authorized access to such devices or systems may be compromised by defeating the fingerprint authentication mechanisms in various ways. For example, a fingerprint sensor may be hacked by malicious individuals who can obtain the authorized user's fingerprint, and copy the stolen fingerprint pattern on a carrier object that resembles a human finger. Such unauthorized fingerprint patterns may be used on the fingerprint sensor to unlock the targeted device. Hence, a fingerprint pattern, although a unique biometric identifier, may not be by itself a completely reliable or secure identification. The techniques, devices and systems described in this document improve upon the fingerprint authentication technology used in existing electronic devices to potentially prevent a stolen fingerprint from being used to gain access to the targeted device.

A capacitive-sensing device may be used for fingerprint identification. A capacitive fingerprint identification system may include a capacitance detecting circuit that detects a capacitance of a capacitor formed by a user's finger relative to at least one sensing electrode within a pixel sensing circuit. The detected capacitance can vary with the distance between a finger ridge or a finger valley and thus may be used to determine the presence and location of a finger ridge or a finger valley of the user's finger based on an output of the capacitance detecting circuitry. The collection of an array of different pixel sensing circuits can measure a capacitance spatial distribution representing a portion of a fingerprint by the measurements made by individual pixel sensing circuits to form a fingerprint pattern that identifies a user. Because a voltage signal of the pixel sensing circuitry sent to the capacitance detecting circuitry may be small and thus can be difficult to detect from the background or other noise, the capacitance detecting circuit may use an integrator to enhance a signal to noise ratio (SNR) of the capacitance detecting circuit. However, due to certain factors including, e.g., the manufacturing processes and the different locations of sensing pixels within the fingerprint sensor, the voltage signal of the pixel sensing circuitry may vary pixel by pixel when the identical sensing occurs at the different pixels, e.g., in absence of a fingerprint. When the integration time period is long, an output voltage of the integrator may fall out of a linear operating region and may be in a saturation region of the circuitry, thus causing erroneous identification of the user's fingerprint.

Embodiments described in this document provide devices, systems, and techniques that implement capacitance detecting circuitry that detects a capacitance of a capacitor and consistently operates within a linear operation region. The capacitance detection circuitry can be applied in various fingerprint detection modules for human fingerprint detection and authentication in accessing large or small devices or systems.

FIG. 1A is a block diagram of an example of a system 180 with a fingerprint sensing module 180 including a capacitive fingerprint sensor 181. The system 180 includes a fingerprint sensor control circuit 184, and a digital processor 186 which may include one or more processors for processing fingerprint patterns and determining whether an input fingerprint pattern is one for an authorized user. The fingerprint sensing system 180 may determine a fingerprint or determine a fingerprint and compare the determined fingerprint to a stored fingerprint to enable or disable functionality in a device or system 188 that is secured by the fingerprint sensing system 180. For example, a fingerprint sensing system 180 at an ATM as the system 188 may determine the fingerprint of a customer requesting to access funds. Based on a comparison of the customer's fingerprint to one or more stored fingerprints, the fingerprint sensing system 180 may cause the ATM system 188 to allow access to funds and may identify the customer in order to associate an appropriate account to credit or deduct the requested funds. For another example, the device or system 188 may be a smartphone or a portable device and the fingerprint sensing system 180 is a module integrated to the device 188.

In operation, the system 180 equipped with a fingerprint sensor operates the fingerprint sensor to capture a portion of a user's fingerprint pattern based on capacitive sensing and a fingerprint processing processor 186 coupled to receive information of a user fingerprint captured by the fingerprint sensor 181 to determine whether the captured user fingerprint is from an authorized user; and a device 188 coupled to the fingerprint processing processor 186. The access to the device 188 is controlled by the fingerprint processing processor 186 based on whether the captured user fingerprint is from an authorized user. When the captured fingerprint matches an authorized user, the access to the device 188 is granted and the access is denied if there is no match. Fingerprint sensor 181 may include multiple fingerprint sensing pixels such as pixels 182A-182E that collectively represent at least a portion of a fingerprint. The sensor 181 may be partitioned into a matrix of pixels. Each pixel may include one or more pixel capacitors and an integrator. The pixel capacitors and integrators are further detailed below.

FIG. 1B is a block diagram showing an exemplary capacitance detection circuit at the chip level (1). Rows 0 through N of sensor pixel arrays are shown in FIG. 1A arranged to have two pixel sensors in different rows share data processing circuitry. For example, pixel sensors in two rows are arranged as groups (2) of pixel sensors. For example, as shown in FIG. 1B, two pixel sensors, "Pixel Capacitor 0" and "Pixel Capacitor 1" in the same column as a group for the "Integrator 0" (2) but in different rows, share the same correlative integrator and coarse quantizer counter. In-pixel ADC includes correlative integrator, coarse quantizer counter and pixel capacitor. Along with the pixel capacitor, the shared correlative integrator and coarse quantizer operate as an integrator or an in-pixel ADC.

Figure 1C:
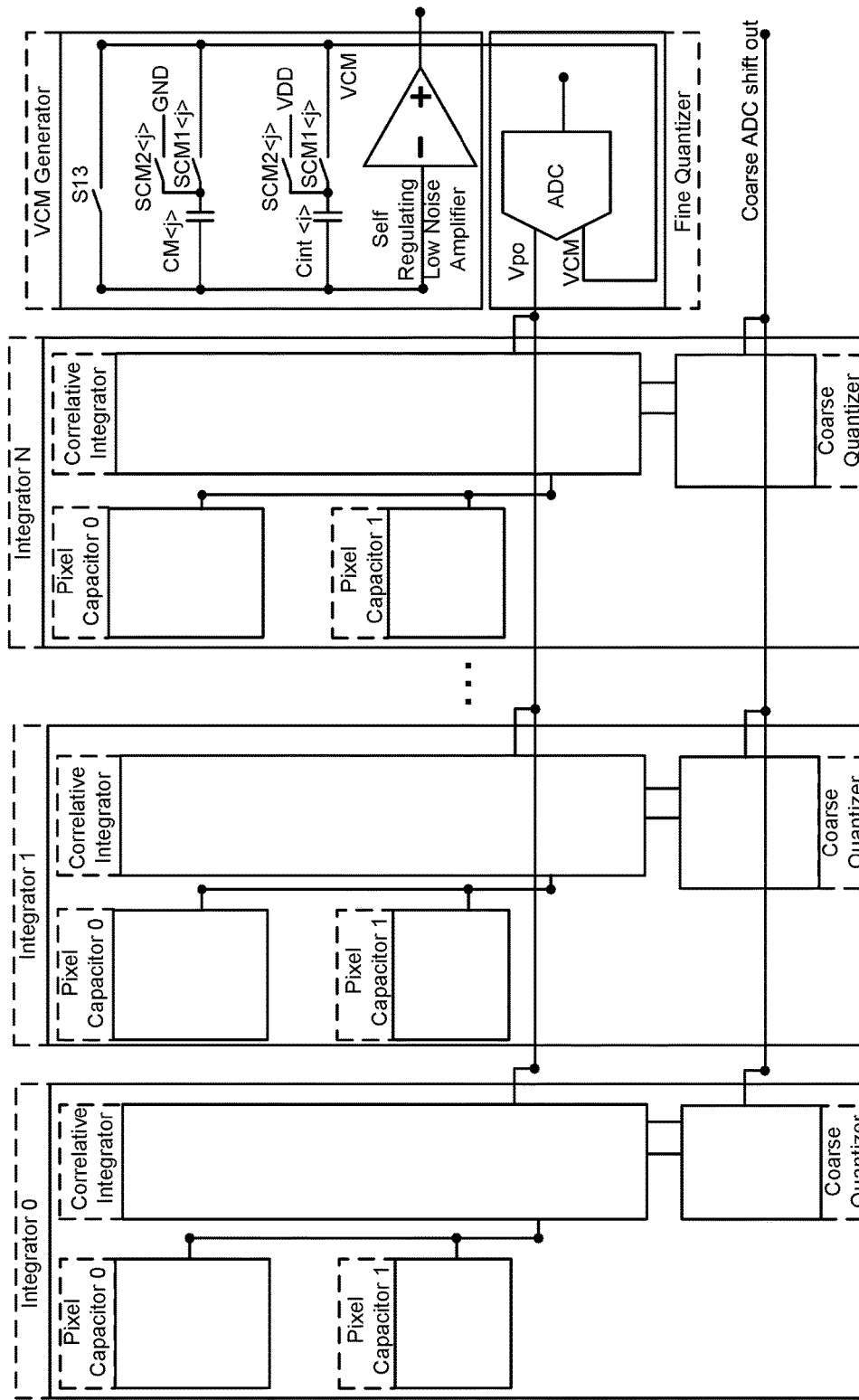
FIG. 1C is another block diagram of rows of first capacitance detecting circuits, in accordance with some example embodiments.
Figure 1D:
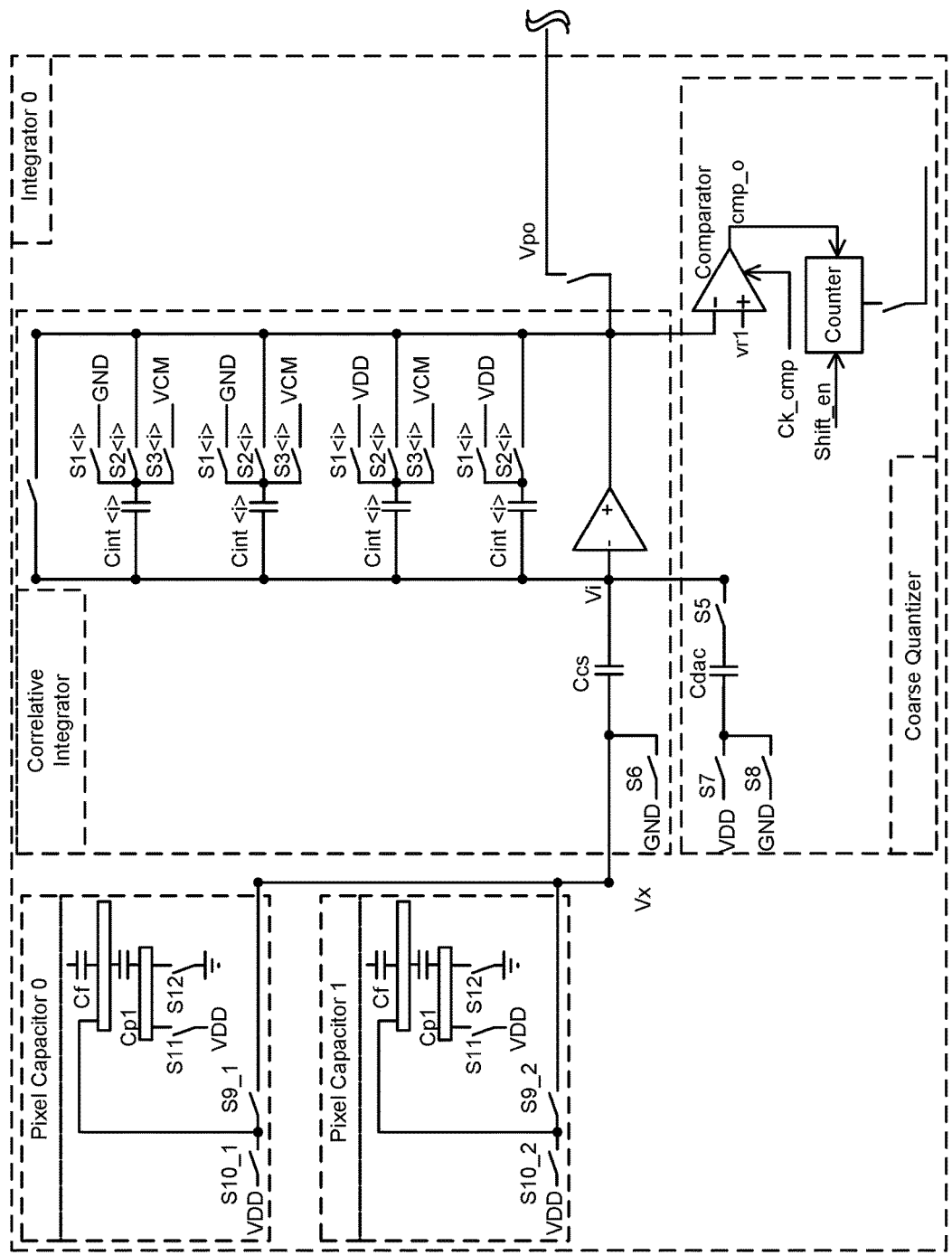
FIG. 1D is a schematic diagram of an integrator in the first capacitance detecting circuit, in accordance with some example embodiments.

FIG. 1C also shows a row of pixels that the integrators (Integrator 0 through Integrator N) in each row share the same fine ADC convertor and VCM generation circuit (common voltage generator). FIG. 1D shows an exemplary circuit for Integrator 0 through Integrator N. The amplifier in the VCM generation circuit that generates the common-mode voltage reference may be a replica of the amplifier in the integrator.

In operation, multiple rows of integrators can start to integrate the signal and save the coarse ADC values in their respective counters of their respective coarse quantizers during the sensing period. After the integration process has been completed, the fine ADC can quantize the output of each Integrator in the same rows sequentially. The counter value (Coarse ADC value) is shifted to the output by connecting all the counters together. The coarse ADC value and the fine ADC value can be combined together in the digital domain.

Figure 1E:
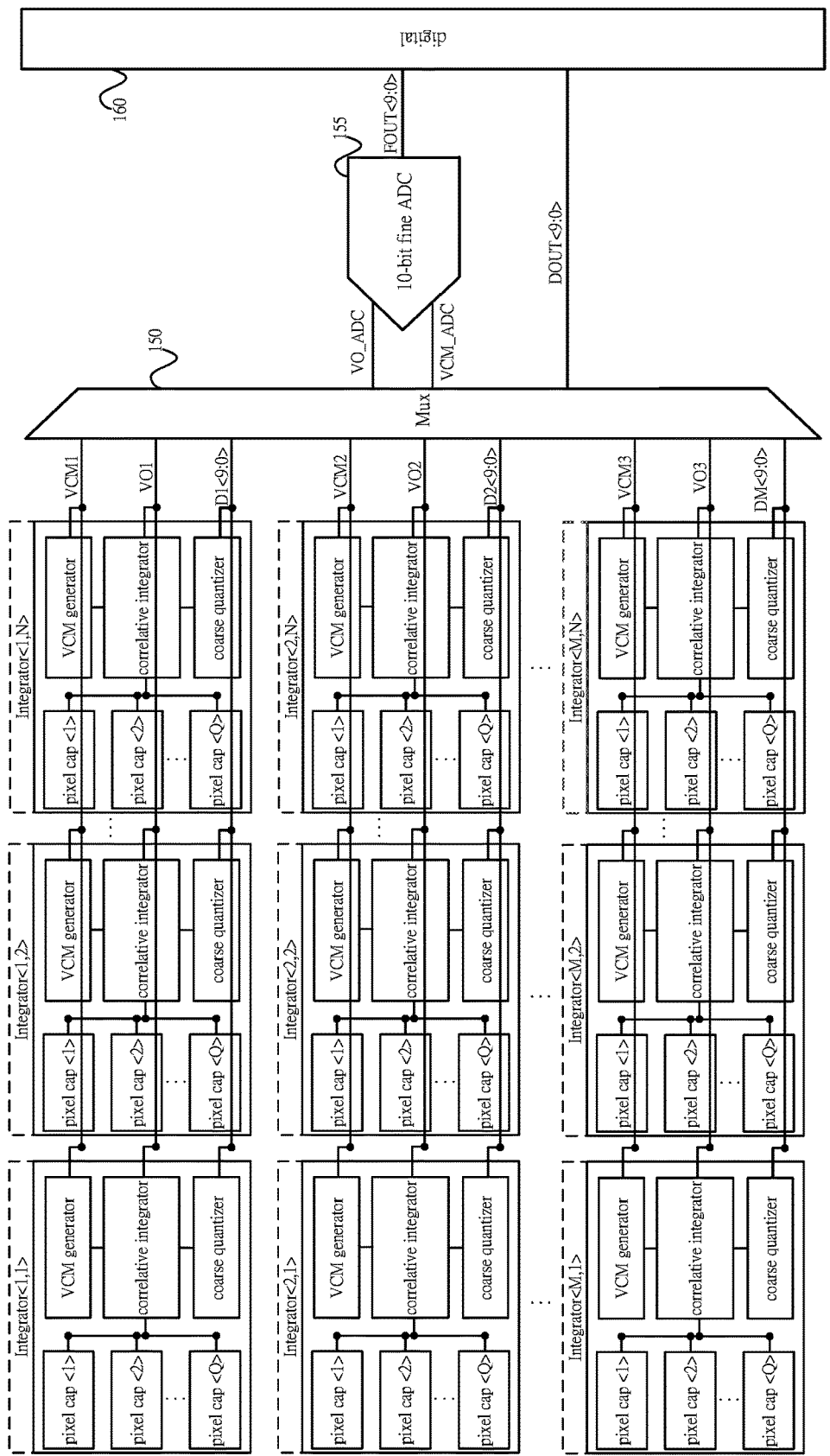
FIG. 1E is a block diagram of a matrix of integrators of the first capacitance detecting circuits, in accordance with some example embodiments.
Figure 1F:
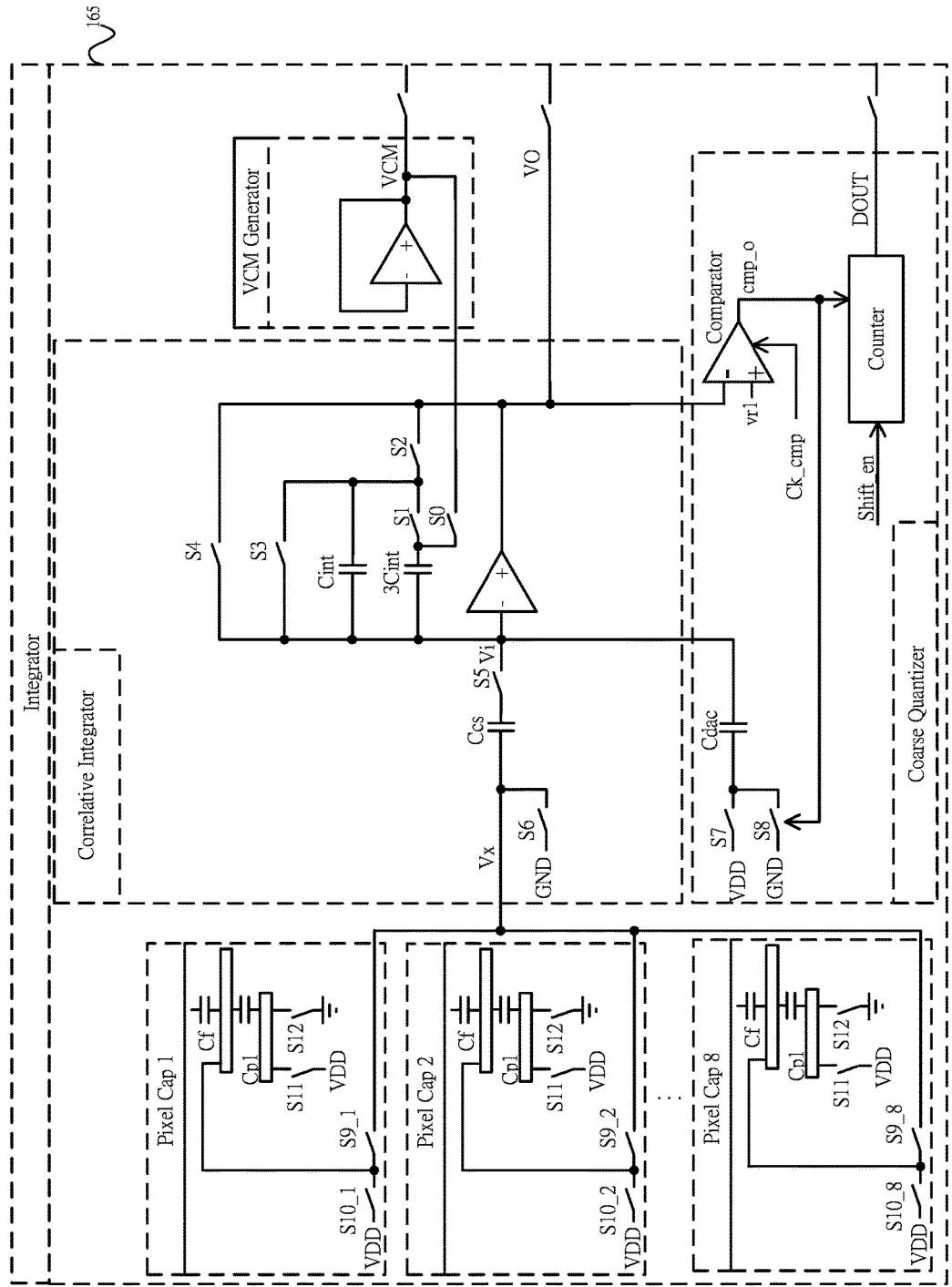
FIG. 1F is another schematic diagram of an integrator of the first capacitance detection circuit, in accordance with some example embodiments.

FIG. 1E depicts a block diagram of a matrix of integrators of a first circuit topology (also referred to herein as the first capacitance detection circuit). The first circuit topology includes coarse quantizers in each integrator, a multiplexer 150, and a 10-bit fine ADC. A second circuit topology is detailed below with respect to FIGS. 8A-10E. In both circuit topologies, the integrator matrix may include one or more rows and columns. At each row and column position, an integrator may be present. In the example of FIG. 1F, an integrator is present in the first row at positions <1,1>, <1,2>, . . . <1,N>, in the second row at positions <2,1>, <2,2>, . . . <2,N>, and all other rows up to the Mth row at positions <M,1>, <M,2>, . . . <M,N>. In this example, there is a total quantity of integrators equal to M*N.

Each integrator may include one or more pixel capacitors, a common mode voltage generator, a correlative integrator, and a coarse quantizer. In the example of FIG. 1E, the integrators have Q pixel capacitors connected together to provide an input to each correlative integrator. Integrator <1,1> may provide a common mode voltage, correlative integrator output (output voltage) and coarse quantizer output to multiplexer. 150. Integrator <2,2> may also provide a common mode voltage, a correlative integrator output, and coarse quantizer output to multiplexer 150. Integrator <M,N> may also provide a common mode voltage, a correlative integrator output, and coarse quantizer output to multiplexer 150. Multiplexer 150 may select which row of integrators to connect to analog-to-digital converter 155. A column within the rows may be selected by a scanning process. Analog-to-digital converter 155 may be a 10-bit analog-to-digital converter as shown in FIG. 1E, or any other bit width converter such as 12-bit, 16-bit, and so on. The coarse quantizer in each integrator may provide one or more most significant bits of a value representative of the detected capacitance and the analog-to-digital converter 155 may determine one or more least significant bits. In the example of FIG. 1E, a coarse quantizer determines the ten most significant bits and the analog-to-digital converter 155 determines the 10 least significant bits of a twenty bit value representative of the pixel capacitance. The ten bit coarse quantized value and the ten bit ADC values may be provided at digital output 160. In some embodiments, the range of the coarse quantizer may overlap the range of the fine quantizer. When overlap occurs, a 10-bit coarse value combined with a 10-bit fine value may produce a 15-bit combined value due to the overlap.

FIG. 1F is an schematic of an integrator 165 of the first capacitance detection circuit. For example, integrator 165 may correspond to any of the integrators shown in FIG. 1F, such as integrator <2,2>. Integrator 165 includes one or more pixel capacitors, the correlative integrator, the coarse quantizer, and common mode voltage generator.

Figure 2:
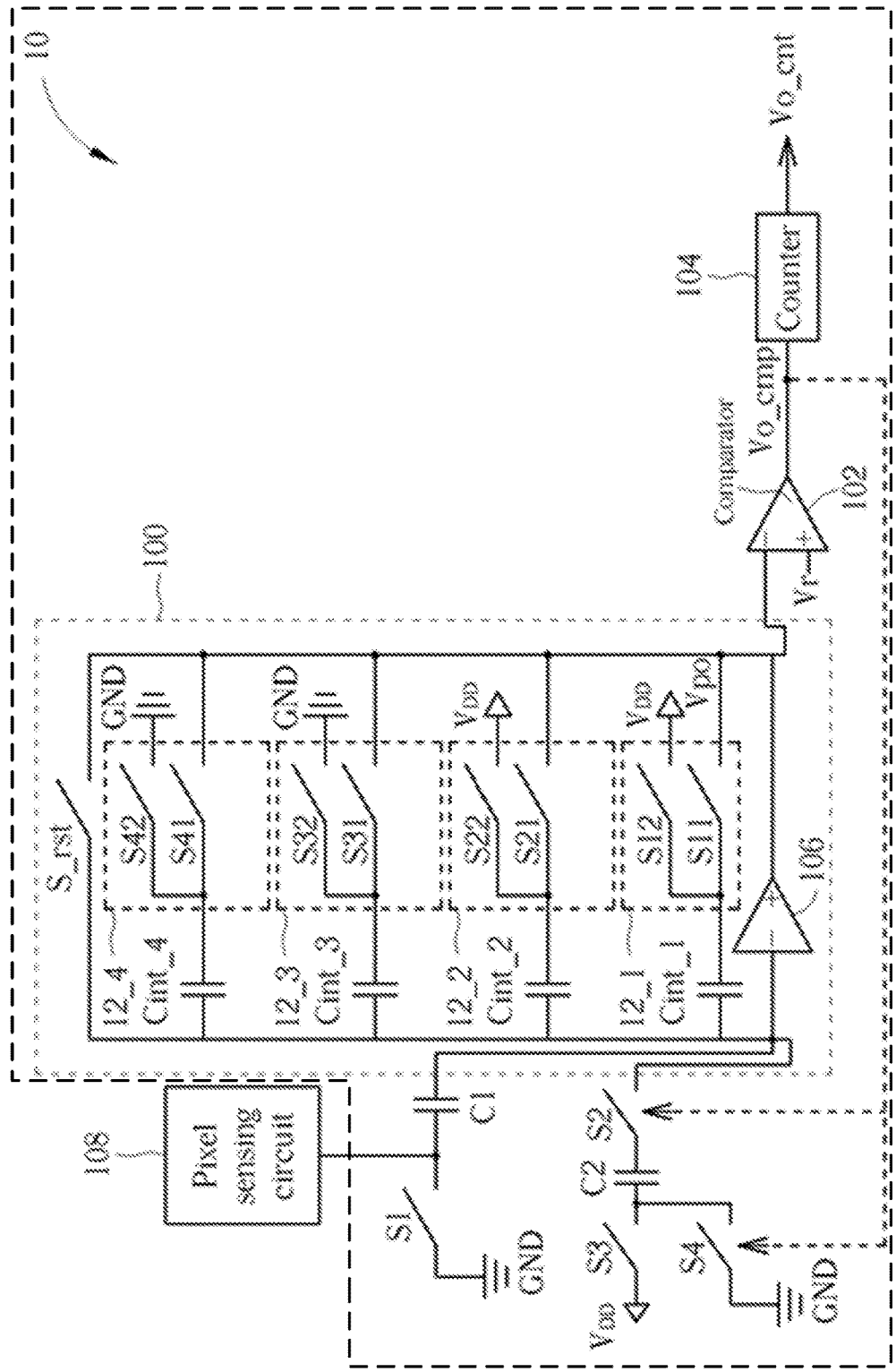
FIG. 2 is a schematic diagram of the first capacitance detecting circuit, in accordance with some example embodiments.

FIG. 2 is a schematic diagram of an exemplary capacitance detecting circuit 10. The capacitance detecting circuit 10 is connected to a pixel sensing circuit 108, so as to detect a capacitance within the pixel sensing circuit 108. The capacitance detecting circuit 10 includes an integrator 100, a comparator 102, a counter 104 and capacitors C1, C2. The capacitor C1 is coupled to the pixel sensing circuit 108. The comparator 102 is coupled to the integrator 100, and the counter 104 is coupled to the comparator 102. In this specific example, the integrator 100 includes a first single-ended amplifier 106, a reset switch S_rst, integration capacitors Cint_1-Cint_4, and switching units 12_1, 12_2, 12_3, and 12_4. The first single-ended amplifier 106 includes a first input terminal (with a negative sign) connected to the integration capacitors Cint_1, Cint_2, Cint_1, and Cint_4 and an integrating output terminal (with a positive sign). The first input terminal is also connected to the capacitor C1 and to the capacitor C2 via a switch S2. The integrating output terminal, which outputs an integrating output voltage Vpo generated by the integrator 100, is connected to the comparator 102. The comparator 102 includes a negative input terminal (with a negative sign) connected to the integrating output terminal, and a positive input terminal (with a positive sign) to receive a reference voltage Vr. The comparator 102 generates a comparing output Vo_cmp by comparing the integrating output voltage Vpo and the reference voltage Vr. The counter 104 is coupled to the comparing output terminal to generate a counter output Vo_cnt according to the comparing output Vo_cmp.

In the illustrated example in FIG. 2, a connection between the capacitor C2 and the first input terminal of the integrator 100 is controlled to conduct (i.e., ON) or cutoff (i.e., OFF) according to the comparing output Vo_cmp to limit the integrating output voltage Vpo to be within a linear operating region of the circuit. In the specific example as shown, a first end of the capacitor C2 is coupled to the first input terminal of the first single-ended amplifier 106 via the switch S2, and a second end of the capacitor C2 is coupled to a voltage generator (not illustrated) generating a voltage $V_{DD}$ via a switch S3 and to a ground GND via a switch S4. The switches S2 and S4 are controlled to conduct (i.e., ON) when the comparing output Vo_cmp indicates that the integrating output voltage is smaller than the reference voltage to limit the integrating output voltage Vpo to be within the linear operating region.

In FIG. 2, the capacitor C1 is coupled to the ground GND via a switch S1. The reset switch S_rst is coupled between the first input terminal and the integrating output terminal. The switching units 12_1, 12_2, 12_3, and 12_4 are coupled to the integration capacitors Cint_1, Cint_2, Cint_3, and Cint_4. Specifically, each of the switching units 12_1, 12_2, 12_3, and 12_4 is coupled to one of the integration capacitors Cint_1, Cint_2, Cint_3, and Cint_4 and the integrating output terminal. In addition, in the embodiment of the capacitance detecting circuit 10 shown in FIG. 1, the switching units 12_1-12_2 are coupled to the voltage generator generating the voltage $V_{DD}$ and the switching units 12_3-12_4 are coupled to the ground GND. Specifically, the switching unit 12_1 and the switching unit 12_2 include switches S11, S12 and switches S21, S22, respectively. The switches S11, S21 are coupled to the integrating output terminal, and the switches S12, S22 are coupled to the voltage generator generating the voltage $V_{DD}$. Similarly, the switching unit 12_3 and the switching unit 12_4 include switches S31, S32 and switches S41, S42, respectively. The switches S31, S41 are coupled to the integrating output terminal, and the switches S32, S42 are coupled to the ground GND.

Figure 3A:
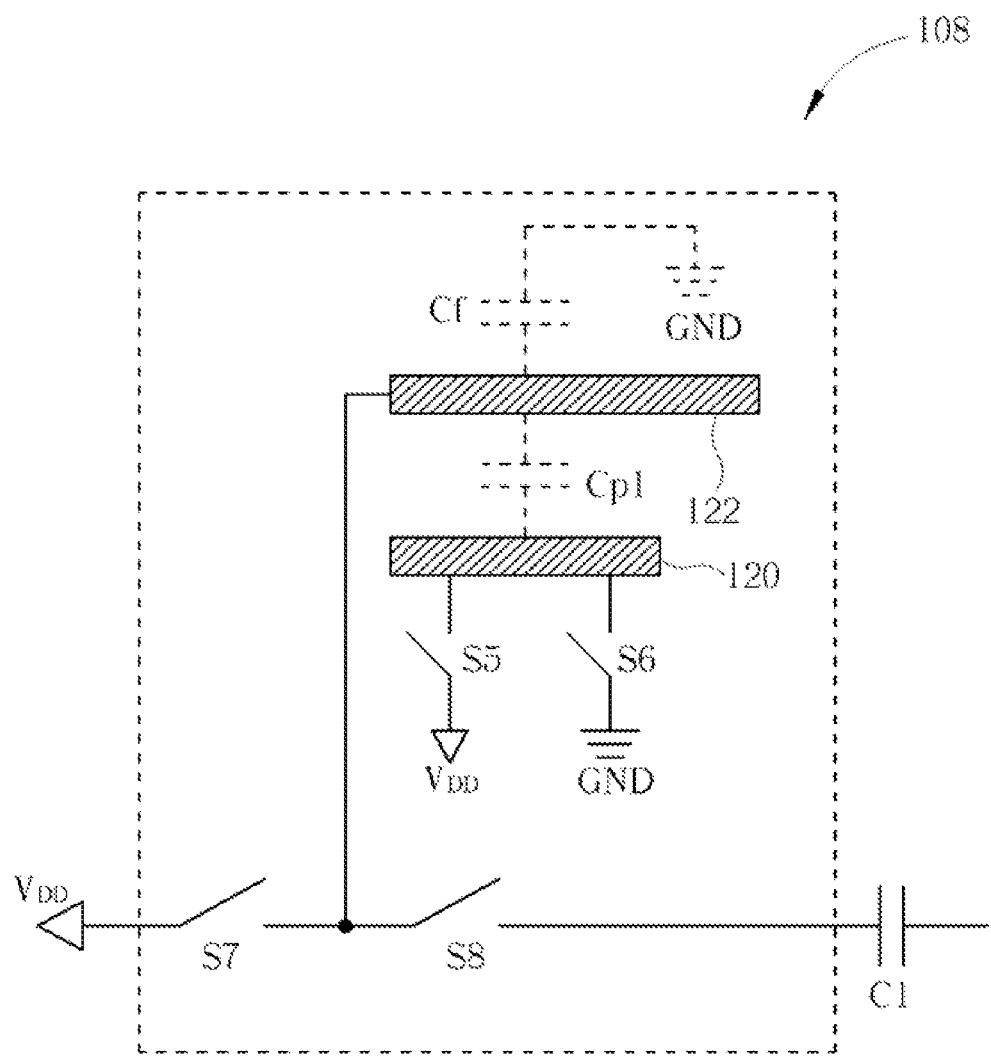
FIG. 3A is a schematic diagram of a pixel sensing circuit, in accordance with some example embodiments.

FIG. 3A illustrates an example of the pixel sensing circuit 108 of FIG. 2. The pixel sensing circuit 108 includes conducting layers 120, 122 where the conducting layer 122 is a top layer or electrode to serve as a sensing electrode that interfaces with a finger, through at least a top dielectric layer above the layer 122, to form a capacitor Cf with the touched portion of the finger to capture a portion of the fingerprint pattern of a touched portion of a finger, and the conducting layer 120 is below the top conducting layer 122. The capacitor Cf is formed between the conducting layer 122 and the user's finger which is the ground GND, and a capacitor Cp1 is formed between the top conducting layer 122 and the underlying conducting layer 120. The conducting layer 120 is coupled to the voltage generator generating the voltage $V_{DD}$ via a switch S5 and to the ground GND via the switch S6. The top conducting layer 122 is coupled to the voltage generator generating the voltage $V_{DD}$ via a switch S7 and to the capacitor C1 via the switch S8. The switches S5, S7 are turned on and the switches S6, S8 are turned off during a first time period. The switches S5, S7 are turned off and the switches S6, S8 are turned on during a second time period, so as to output a voltage Vx to the capacitance detecting circuit 10. The capacitance detecting circuit 10 can detect a capacitance of the capacitor Cf for capturing a fingerprint pattern at that pixel.

Figure 3B:
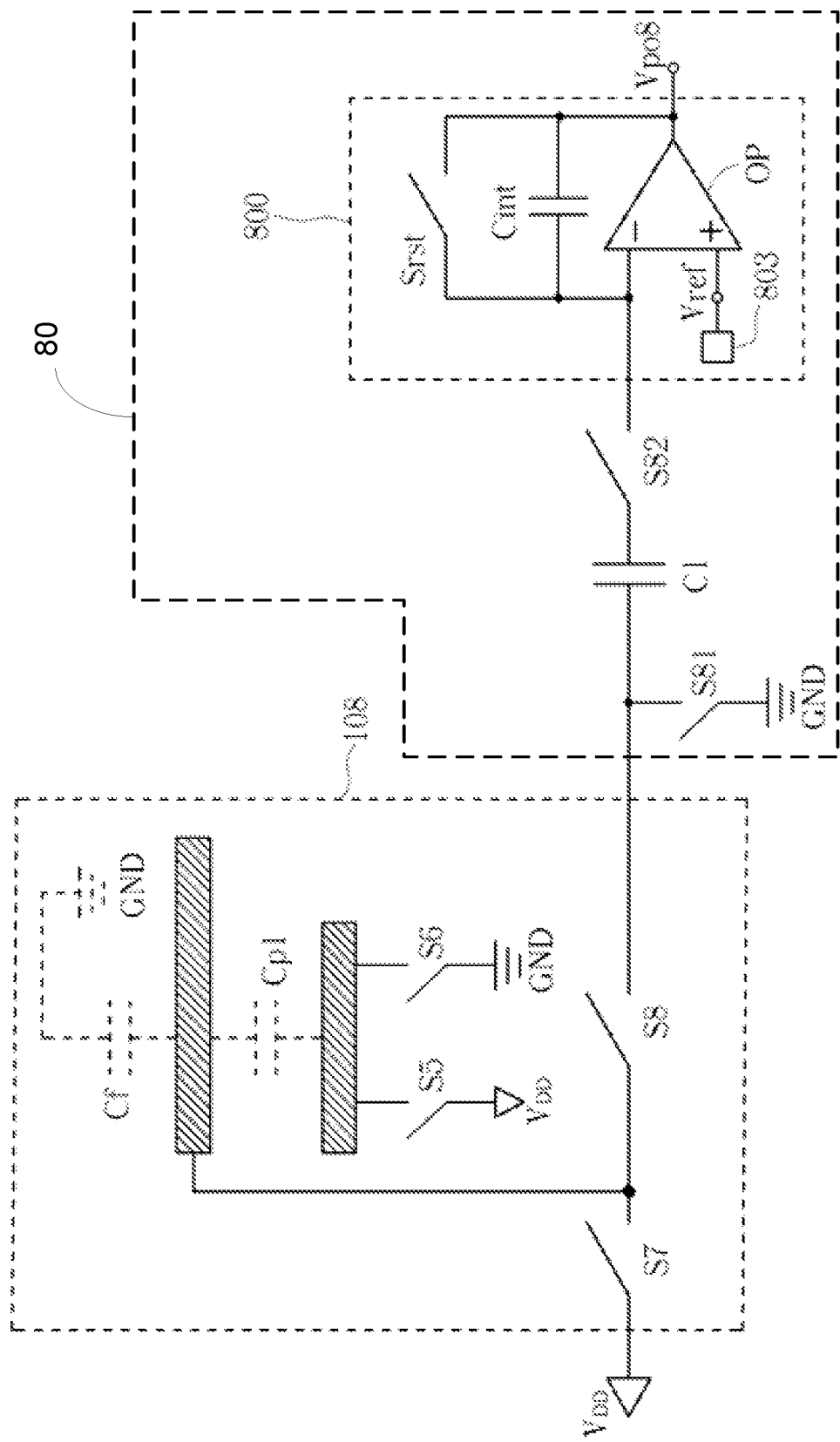
FIG. 3B is a schematic diagram of a capacitance detecting circuit, in accordance with some example embodiments.

FIG. 3B is a schematic diagram of an exemplary capacitance detecting circuit 80 associated with the pixel sensing circuit 108 in FIG. 3A. The capacitance detecting circuit 80 is coupled to the pixel sensing circuit 108 to receive the output from the top conducting layer 122 that interfaces with a user's finger. The capacitance detecting circuit 80 includes the capacitor C1, switches S81, S82 and an integrator 800.

A first end of the capacitor C1 is connected to the pixel sensing circuit 108, and a second end of the capacitor C1 is coupled to the integrator 800 via the switch S82. The switch S81 is coupled between the first end of the capacitor C1 and the ground GND. The integrator 800 includes a reference voltage generator 803, an amplifier OP, an integrating capacitor Cint and a reset switch Srst. The reference voltage generator 803 may generate a reference voltage Vref. The amplifier OP includes a positive input terminal coupled to the reference voltage generator 803 for receiving the reference voltage Vref, a negative input terminal coupled to the switch S82, and an output terminal for outputting an integrating output voltage Vpo8. The integrating capacitor Cint and the reset switch Srst are coupled between the negative input terminal and the output terminal of the amplifier OP. The integrating output voltage Vpo8 may be sent to a back end ADC (not illustrated in FIG. 9) to perform fingerprint identification. Thus, by choosing the capacitor C1 with large capacitance, the capacitor C1 is able to absorb most of charges stored in the capacitor Cf and the integrating output voltage Vpo can be more significant.

Figure 4A:
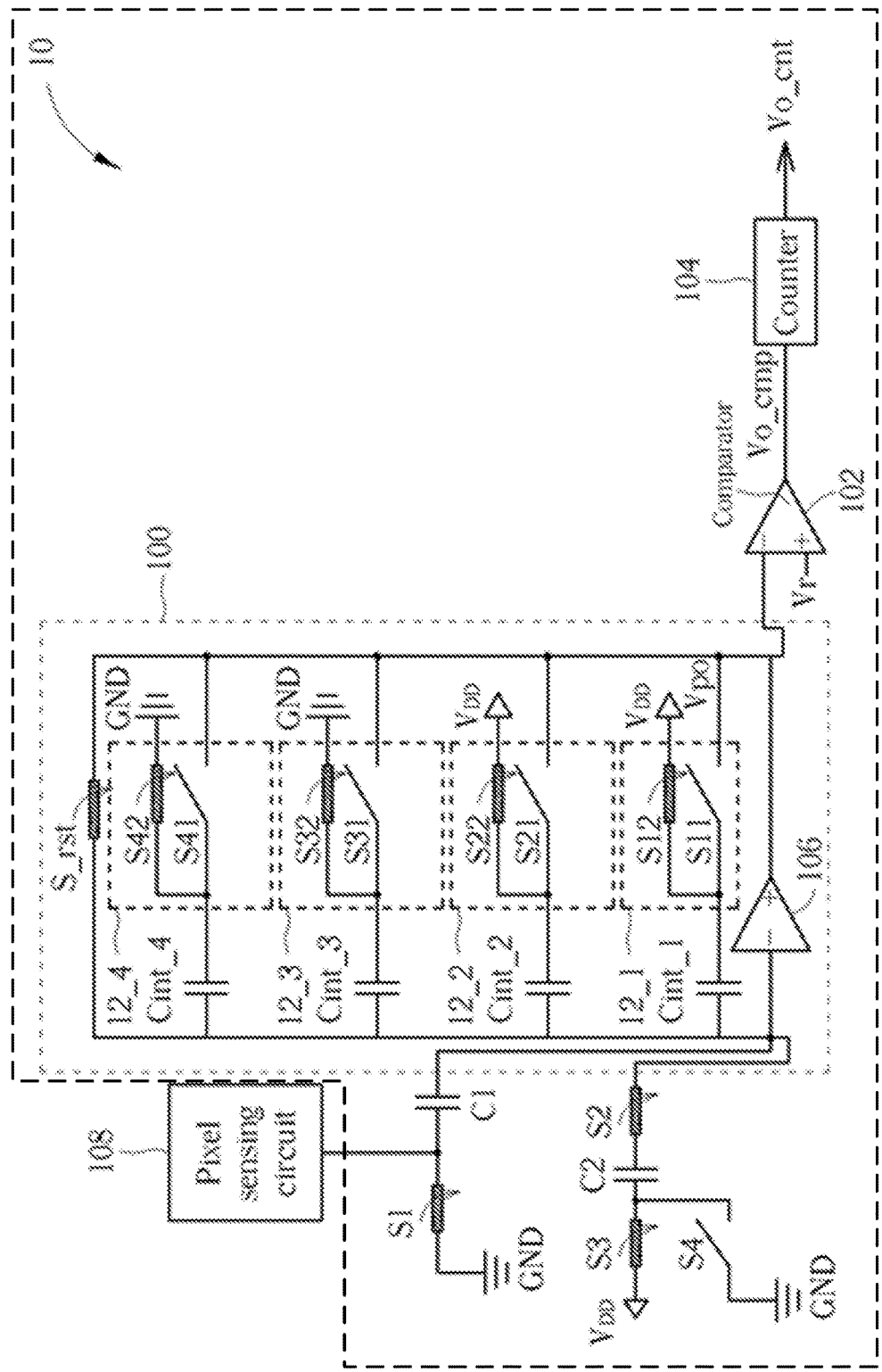
FIGS. 4A-4D are schematic diagrams illustrating the first capacitance detecting circuit in FIG. 2, in accordance with some example embodiments.

FIGS. 4A-4D are diagrams illustrating examples of different phases of operations of the capacitance detecting circuit 10 to detect the capacitance of the capacitor Cf. FIG. 4A shows an example of a first phase of the operation where the switches S1, S2, S3, S12, S22, S32, S42, and S_rst are conducting (ON), and the switches S4, S11, S21, S31, S41 are cutoff (OFF). During the first phase, the switch S_rst is turned ON causing the first input terminal to be electrically connected to the integrating output terminal leading to the generation of an initial voltage Vi, and the capacitors C1, C2, Cint_1-Cint_4 are charged related to the initial voltage Vi.

Figure 4B:
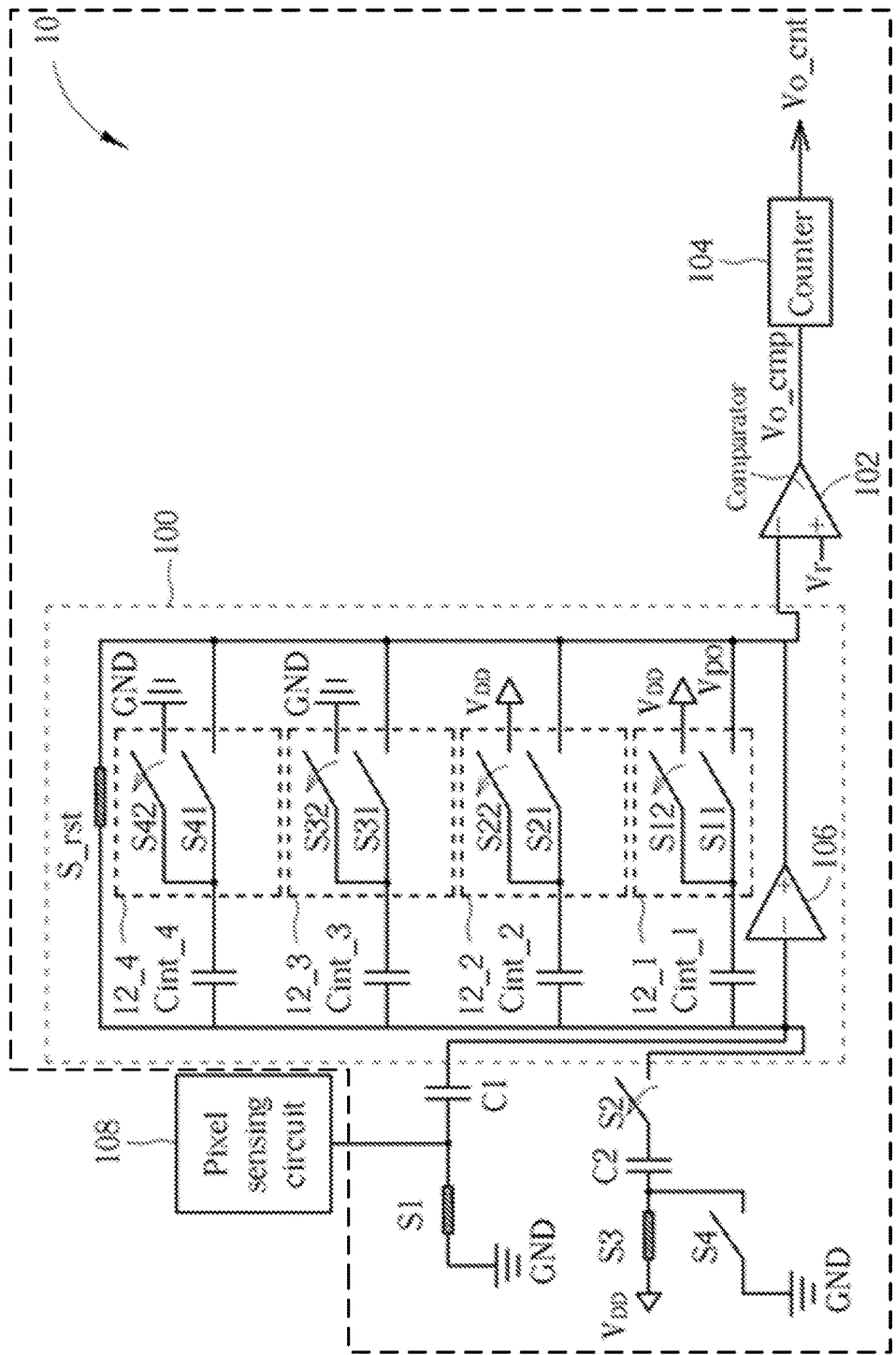

FIG. 4B shows an example of a second phase of the operation where the switches S12, S22, S32, S42 and S2 are cutoff (OFF). The switches S1 and S_rst remain in a conducting state (ON), and the switches S4, S11, S21, S31, S41 remain cutoff (OFF). During the second phase, electronic charges stored in the capacitors Cint_1, Cint_2, Cint_3 and Cint_4 are re-distributed. Redistribution of the charges causes the integrating output voltage Vpo to have an initial value of $V_{DD}/2$, before the integrator 100 starts to perform integration, by properly choosing capacitances of the capacitors Cint_1, Cint_2, Cint_3 and Cint_4.

Figure 4C:
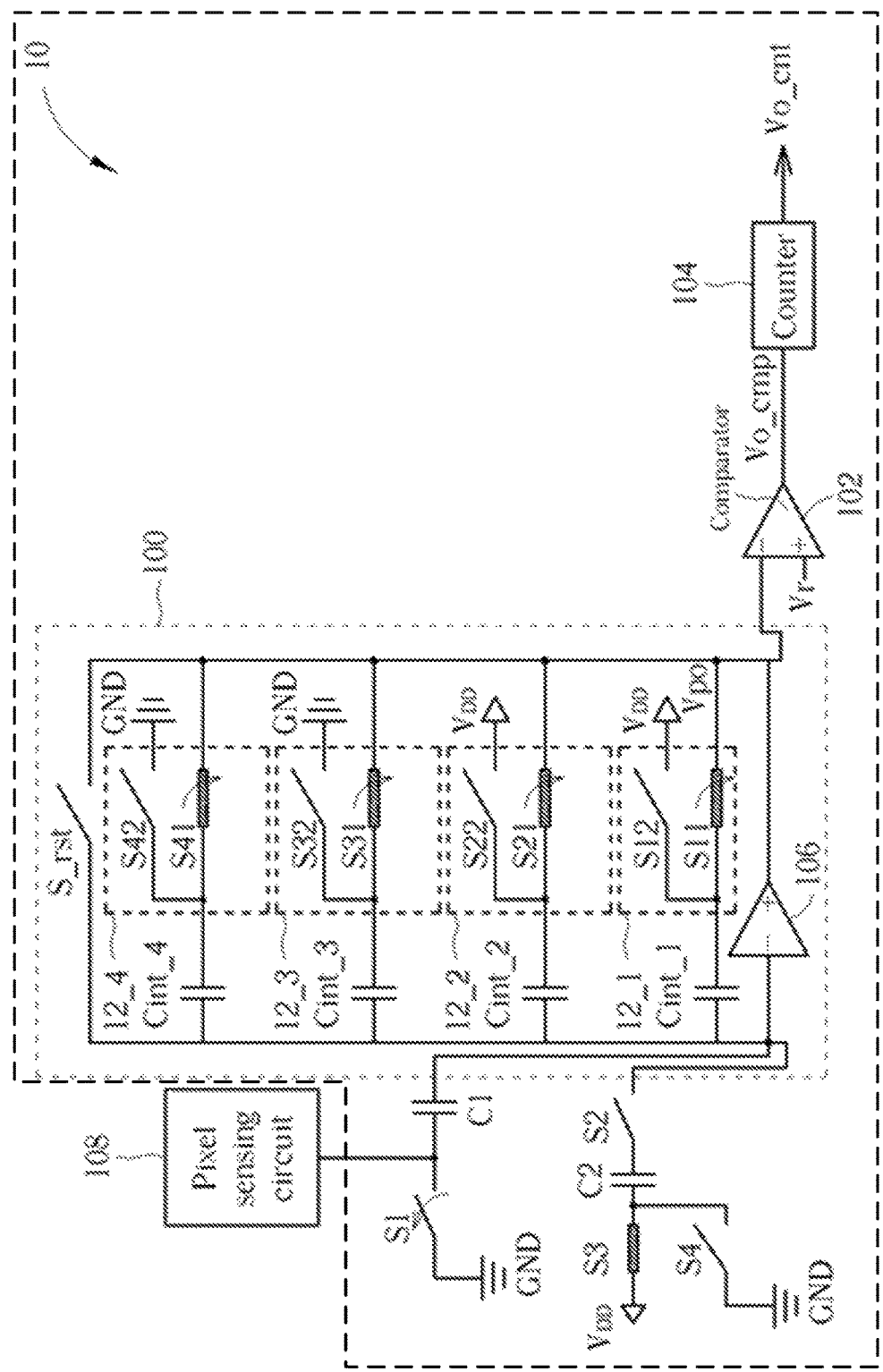

FIG. 4C shows an example of a third phase of the operation where the switches S11, S21, S31, S41 are in the conducting state (ON) and the switches S_rst and S1 are cutoff (OFF). The switch S3 remains in the conducting state. The switches S2, S4, S12, S22, S32, and S42 remain cutoff (OFF). During the third phase, the integrator 100 performs integration, i.e., electronic charges stored in the capacitor Cf (in the first time period) are poured into the integration capacitors Cint_1, Cint_2, Cint_3 and Cint_4 (in the second time period). The integrating output voltage Vpo decreases gradually, in this embodiment. Once the integrating output voltage Vpo becomes smaller than the reference voltage Vr, the capacitance detecting circuit 10 enters a fourth phase of operation.

Figure 4D:
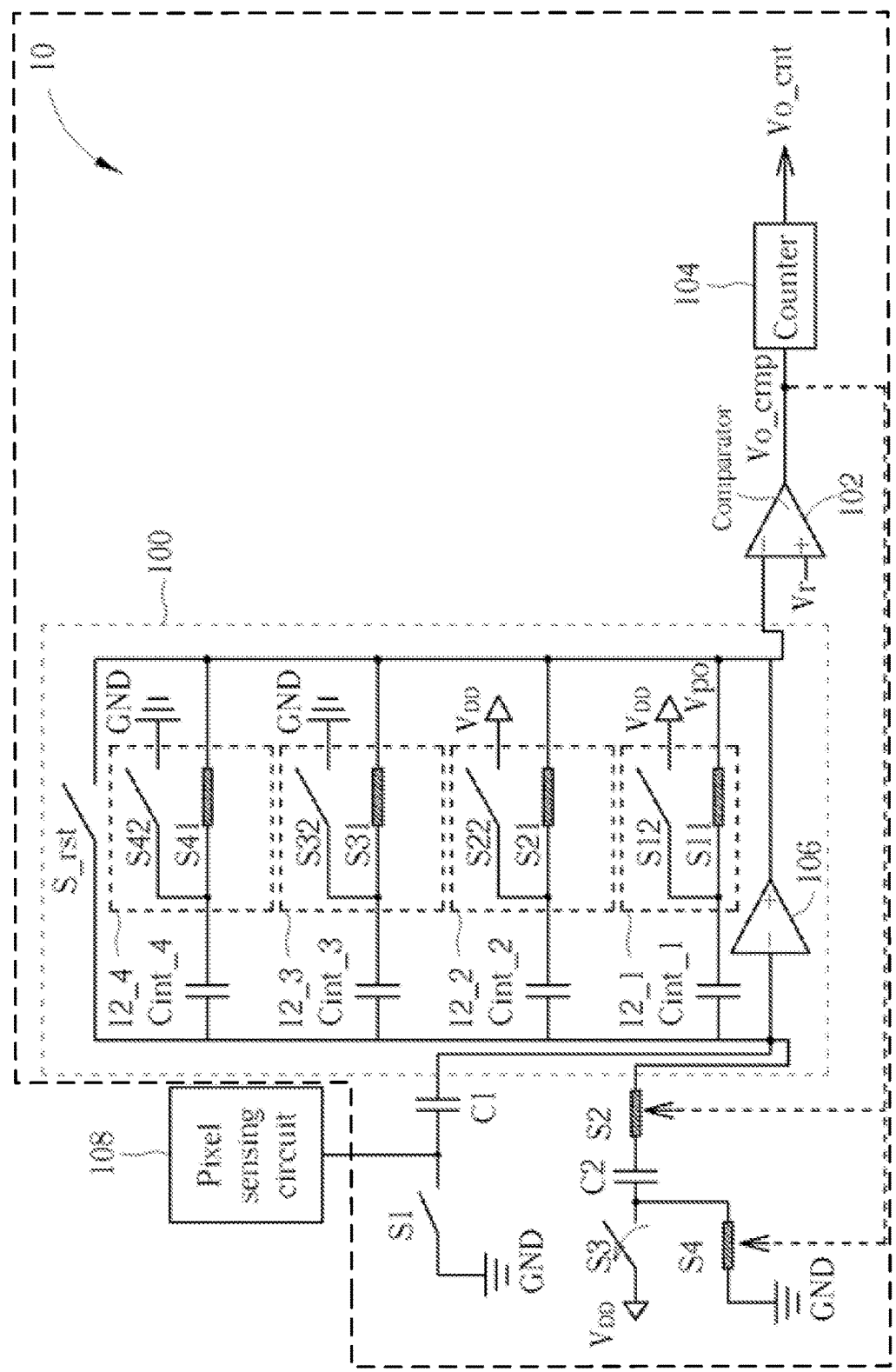

FIG. 4D shows an example of the fourth phase of operation where the switches S2 and S4 are in the conducting state (ON) and the switch S3 becomes cutoff (OFF). The switches S1, S3, S_rst, S12, S22, S32, and S42 remain cutoff (OFF), and the switches S11, S21, S31, and S41 remain in the conducting state (ON). In the fourth phase, since the switches S2, S4 become conducted, a significant voltage drop at the first input terminal is caused. The integrating output voltage Vpo would thereby be pulled up drastically to an upper voltage Vup. An incremental amount between the upper voltage Vup and the reference voltage Vr is related to a capacitance of the capacitor C2.

Figure 5:
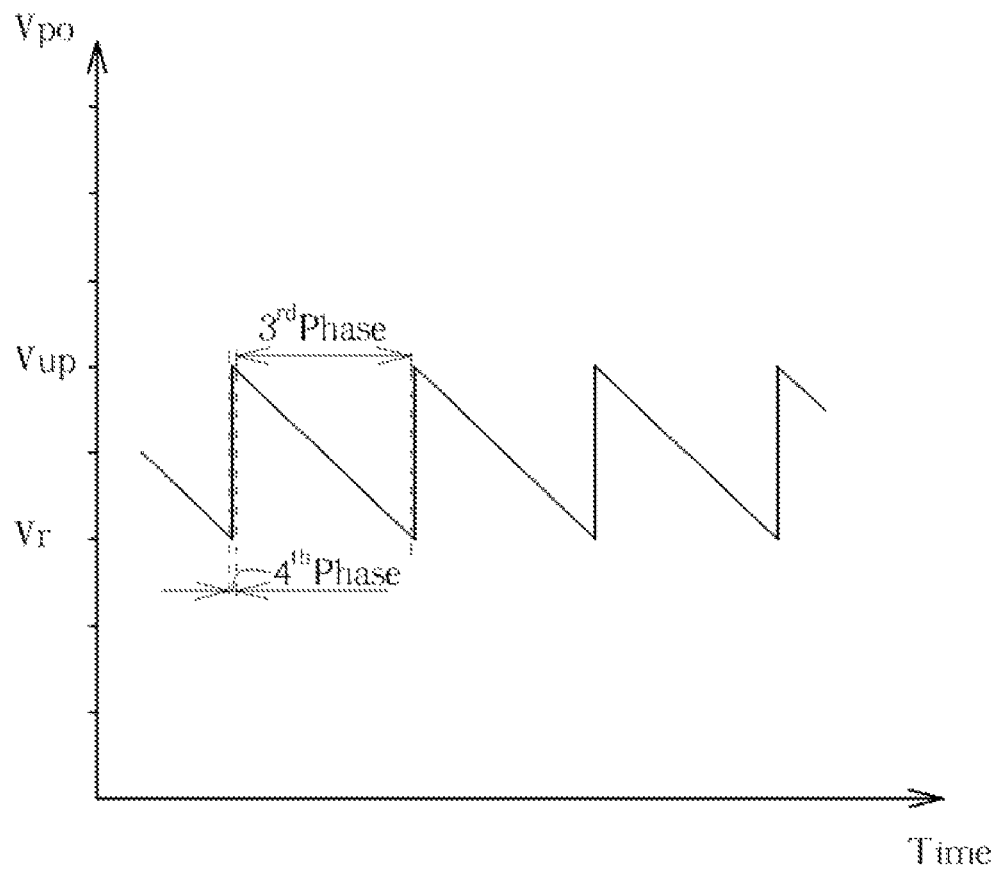
FIG. 5 is a diagram of a waveform of the first capacitance detecting circuit in FIG. 2, in accordance with some example embodiments.

FIG. 5 shows an exemplary time scale waveform of the integrating output voltage Vpo. After the integrating output voltage Vpo is pulled up to Vup at the end of the fourth phase (FIG. 4D), the integrator 100 may go back to the third phase (FIG. 4C) and keep performing integration. Hence, the integrating output voltage Vpo would again decrease gradually, until next time the integrating output voltage Vpo falls below the reference voltage Vr. As shown in FIG. 5, the integrating output voltage Vpo varies within a range between the upper voltage Vup and the reference voltage Vr. In some implementations, the reference voltage Vr is designed to be $7V_{DD}/16$ and the upper voltage Vup is designed to be $9V_{DD}/16$. Hence, the integrating output voltage Vpo can be maintained within the linear operating region of the capacitance detecting circuit 10.

To evaluate the capacitance of the capacitor Cf, the counter 104 generates the counter output Vo_cnt by counting the total number of times the integrating output voltage Vpo falls below the reference voltage Vr. The larger the capacitor Cf, the faster the integrating output voltage Vpo decreases. Hence, the counter output Vo_cnt gathered within a certain period of time represents the capacitance of the capacitor Cf.

In the above described operations, the capacitance detecting circuit 10 controls the ON-OFF statuses of the switches S2, S4 coupled to the capacitor C2 based on the comparing output Vo_cmp generated by the comparator 102, so as to restrict the integrating output voltage Vpo to remain within the range, which belongs to the linear operating region of the capacitance detecting circuit 10. Thus, the integrating output voltage Vpo as disclosed in this patent document is prevented from being out of the linear operating region (i.e., Vpo is maintained within the linear operation region). In addition, the capacitance detecting circuit 10 utilizes a single-ended amplifier within the integrator. Compared to using operational amplifiers with two input terminals, utilizing the single-ended amplifier is able to lower the noise in the circuit and further enhance a signal to noise ratio (SNR) of the circuit.

Various modifications to the capacitance detecting circuit 10 and associated operation are possible. For example, a number of the integration capacitors and switching units coupled between the first input terminal and the integrating output terminal can vary beyond the four shown. In addition, in the capacitance detecting circuit 10, half of the switching units are connected to the ground, and the other half of the switching unit are connected to the voltage generator generating the voltage $V_{DD}$, such that the initial value of the integrating output voltage Vpo would be $V_{DD}/2$. In some implementations, less than half of the switching units can be connected to the ground, and the rest of the switching units are connected to the voltage generator generating the voltage $V_{DD}$. In some implementations, more than half of the switching units can be connected to the ground, and the rest of the switching units are connected to the voltage generator generating the voltage $V_{DD}$.

In addition, to detect the capacitor Cf more precisely, a common mode voltage generator and an analog to digital converter (ADC) may be included.

Figure 6:
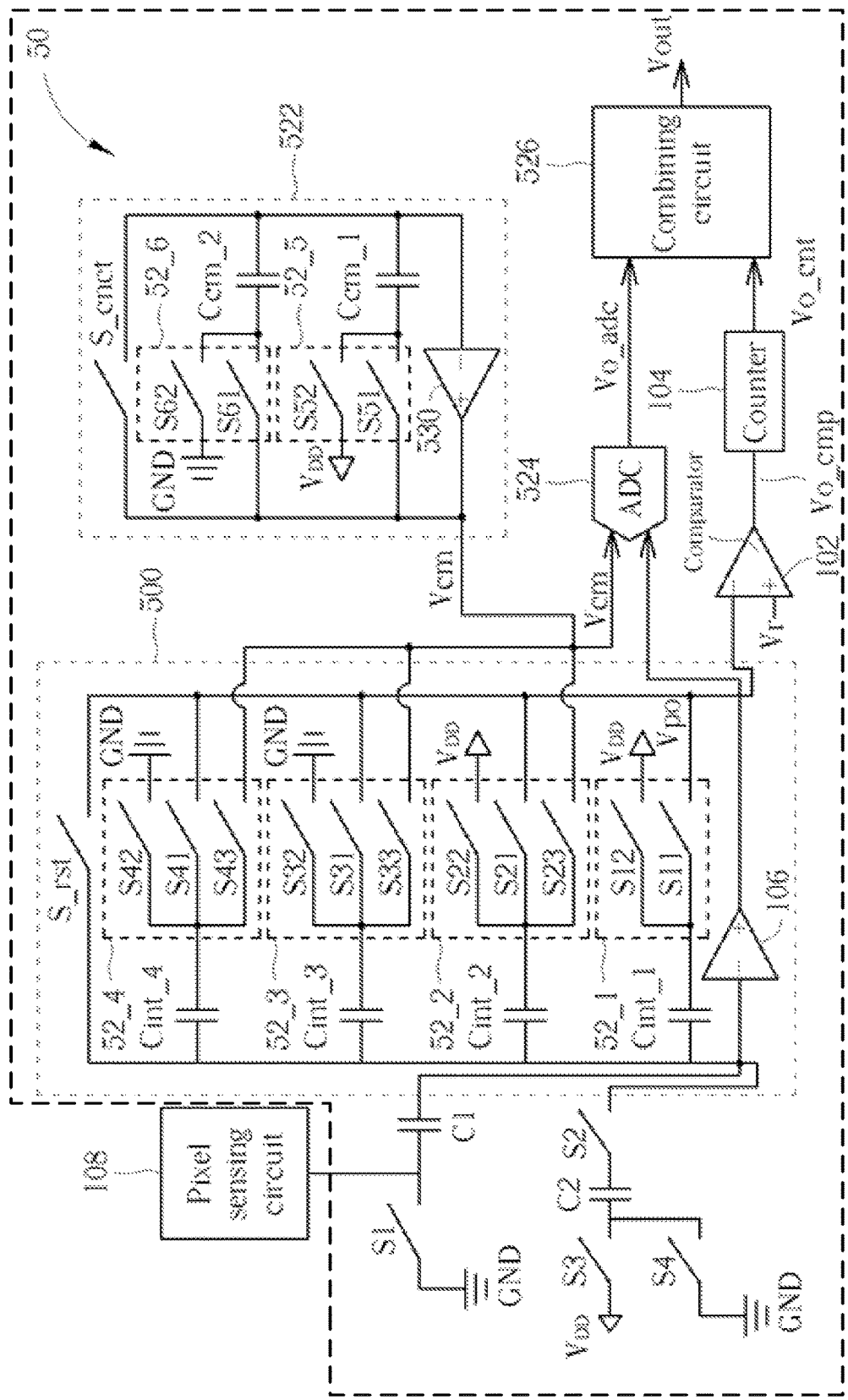
FIG. 6 is a schematic diagram of the first capacitance detecting circuit, in accordance with some example embodiments.

FIG. 6 is a schematic diagram of an exemplary capacitance detecting circuit 50. The capacitance detecting circuit 50 is similar to the capacitance detecting circuit 10, and thus, same components are identified using same reference notations. Compared to the capacitance detecting circuit 10, the capacitance detecting circuit 50 further includes a common mode voltage generator 522 to generate a common mode voltage Vcm, an ADC 524, and a combining circuit 526. The common mode voltage generator 522 includes a second single-ended amplifier 530, common mode capacitors Ccm_1 and Ccm_2, switching units 52_5 and 52_6, and a connecting switch S_cnct. The second single-ended amplifier 530 includes a second input terminal (with a negative sign) and a second output terminal (with a positive sign). The second output terminal is connected to switching units 52_2, 52_3, and 52_4 of an integrator 500 in the capacitance detecting circuit 50. The ADC 524 is coupled to the integrating output terminal and the second output terminal to receive the integrating output voltage Vpo and the common mode voltage Vcm, respectively. The ADC 524 is configured to generate an ADC output Vo_adc according to the integrating output voltage Vpo and the common mode voltage Vcm. The ADC output Vo_adc and the counter output Vo_cnt are further combined to generate an overall output V_out via the combining circuit 526.

Furthermore, as FIG. 6 shows, in the integrator 500, the switching units 52_2, 53_3, and 52_4 also include switches S23, S33, and S43 respectively and coupled to the second output terminal to selectively conduct connections between the integration capacitors Cint_2-Cint_4 and the second output terminal. In the common mode voltage generator 522, the common mode capacitors Ccm_1-Ccm_2, the switching units 52_5-52_6, and the switch S_cnct are connected between the second input terminal and the second output terminal. Specifically, the switching units 52_5 and 52_6 include switches S51 and S61 connected to the common mode capacitors Ccm_1 and Ccm_2, respectively, and to the second input terminal. In addition, the switching unit 52_5 includes a switch S52 connected between the voltage generator generating the voltage $V_{DD}$ and the common mode capacitor Ccm_1. The switching unit 52_6 includes a switch S62 connected between the ground GND and the common mode capacitor Ccm_2.

Figure 7A:
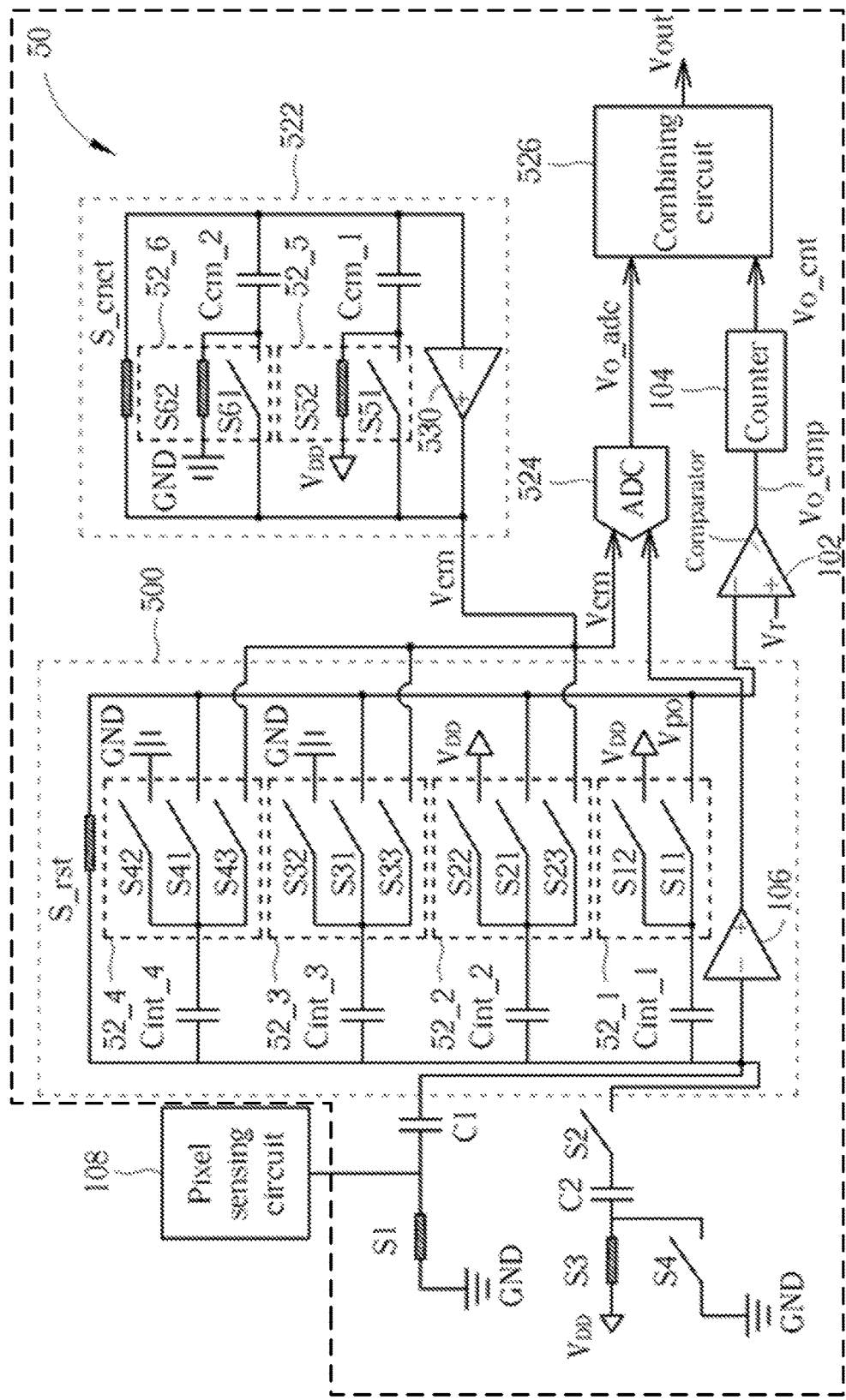
FIGS. 7A and 7B are schematic diagrams of the first capacitance detecting circuit, in accordance with some example embodiments.
Figure 7B:
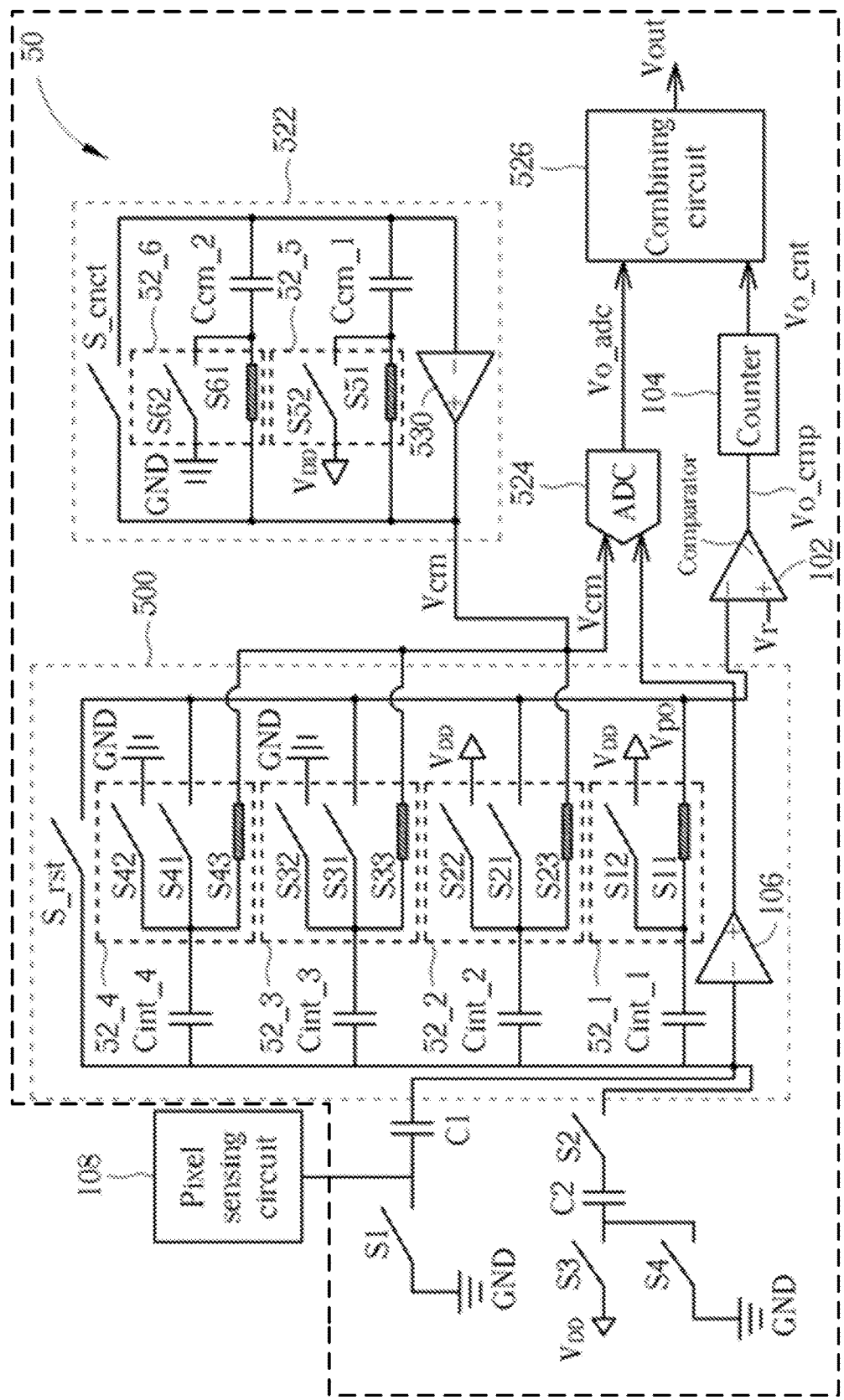

FIGS. 7A and 7B illustrate examples of operations of the capacitance detecting circuit 50 generating the overall output V_out. In a phase of initializing the common mode voltage generator 522, as shown in FIG. 7A, the switches S52, S62, S_cnct are in the conducting state (ON). In the phase of initializing the common mode voltage generator 522, electronic charges are stored in the common mode capacitors Ccm_1 and Ccm_2.

In a phase of generating the ADC output Vo_adc, the switches S52, S62, and S_cnct become cutoff (OFF) and the switches S51 and S61 are in the conducting state (ON). The electric charges stored in the common mode capacitors Ccm_1 and Ccm_2 are re-distributed and the common mode voltage Vcm is generated. The common mode voltage will become VDD/2. Also, the switches S23, S33, and S43 become conducted (ON). Hence, the electric charges stored in the capacitor Cf are poured to the integration capacitor Cint_1 without connecting to the common mode voltage generator 522, such that the integrating output voltage Vpo is amplified. Vpo_amplified=4*(Vpo−VCM)+VCM. The amplified integrating output voltage Vpo is outputted to the ADC 524 to generate the ADC output Vo_adc. Vo_adc=Floor((VCM−Vpo_amplified)/(VDD/4)*2^(N−1)). Vo_adc range from $2^{\wedge}(N-1)-1$ to $-2^{\wedge}(N-1)$. The overall output V_out generated by the combining circuit 526 may be expressed as V_out=Vo_cnt*2^(N)+Vo_adc, wherein N represents a resolution of the ADC 524.

The capacitance detecting circuit 10 or the capacitance detecting circuit 50 as disclosed in this patent document may be applied to a fingerprint identification system.

Figure 8A:
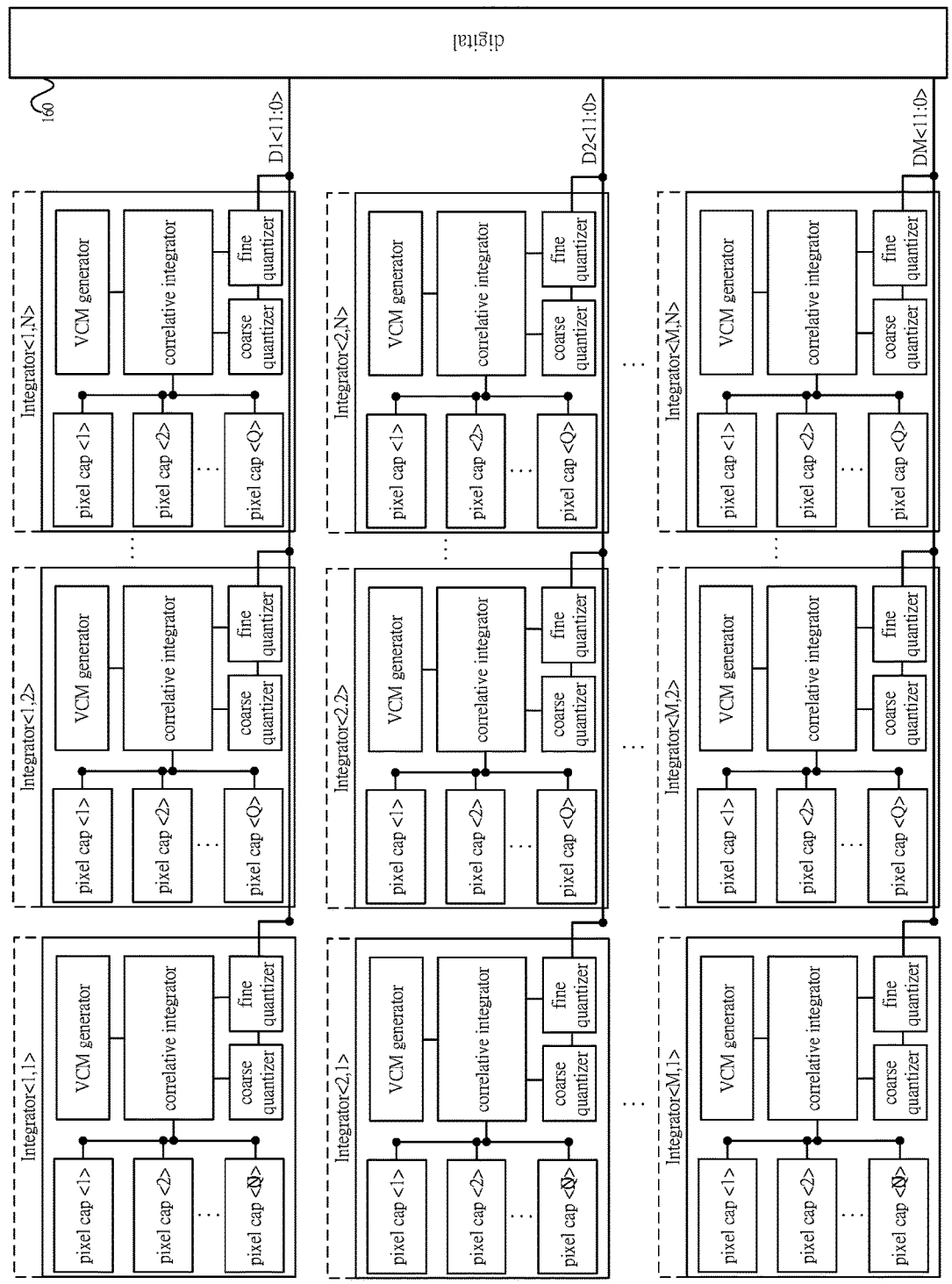
FIG. 8A is a block diagram of a matrix of integrators of a second capacitance detection circuit, in accordance with some example embodiments.

FIG. 8A is a block diagram of an example of a matrix of integrators of a second capacitance detection circuit. Compared to the matrix of integrators of the first capacitance detection circuit, the second capacitance detection circuit includes a coarse quantizer and a fine quantizer in each integrator in the matrix. The second capacitance detection circuit also has no multiplexer and no analog-to-digital converter external to each integrator (155 in FIG. 1F is not needed in the second capacitance detection circuit).

The matrix may include one or more rows and one or more columns. At each row and column position, an integrator may be present. In the example of FIG. 8A, an integrator is present in the first row at each of positions <1,1>, <1, 2>, . . . <1, N>, in the second row at each of positions <2,1>, <2, 2>, . . . <2, N>, in each position in each row up to the Mth row at each of positions <M,1>, <M, 2>, . . . <M, N>. In this example, there is a total number of integrators equal to M*N, where M is the quantity of rows and N is the quantity of columns. Each integrator may include one or more pixel capacitors, a common mode voltage generator, a correlative integrator, a coarse quantizer, and a fine quantizer. For example, integrator <1,1> may have Q pixel capacitors connected together to provide an input to the correlative integrator. Integrator <1,1> may include a common mode voltage generator, a correlative integrator, and a quantizer output that combines the values determined from the coarse quantizer and fine quantizer. For example, the coarse quantizer may determine the most significant eight bits and the fine quantizer may determine a least significant four bits of a twelve bit value representative of a capacitance. The quantizer output (combined coarse and fine values) may be provided at digital output 160. In some embodiments, each row may have a digital output where the quantizer outputs from each integrator in the row may be connected together and connected to digital output 160. Which integrator within each row that will provide the quantizer output may be selected using a scanning process. Each row may have a separate connection to digital interface 160. Integrators in each row may also include a common mode voltage generator, a correlative integrator, and a quantizer (combining coarse and fine values).

Figure 8B:
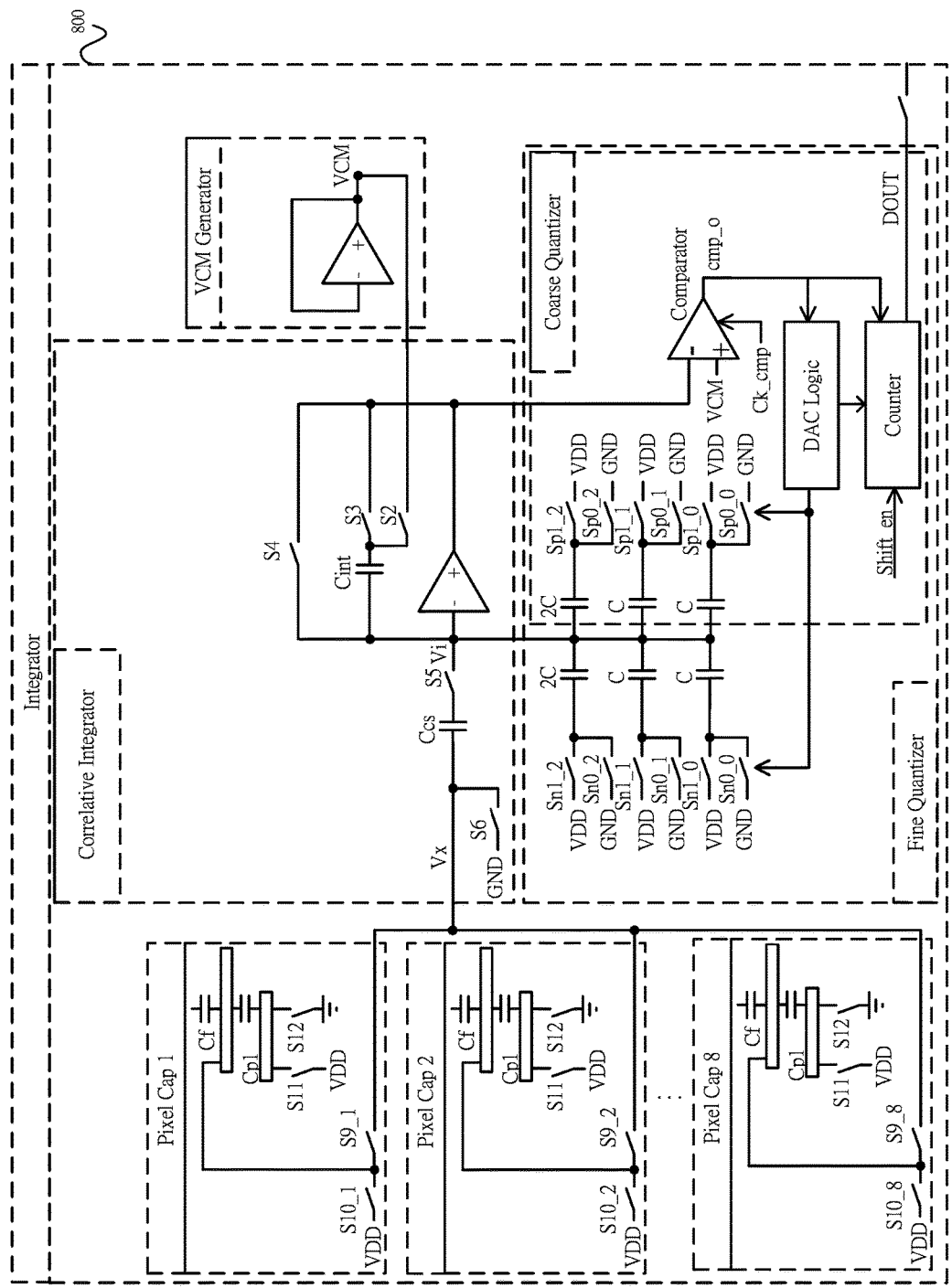
FIG. 8B is a schematic of an integrator of the second capacitance detection circuit, in accordance with some example embodiments.

FIG. 8B depicts a schematic of an example of an integrator 800 such as one of the integrators in FIG. 8A. For example, integrator 800 may be integrator <1,1> or any other integrator shown in FIG. 8A. Integrator 800 includes one or more pixel capacitors such as pixel cap 1, pixel cap 2, . . . , pixel cap 8, shown in FIG. 8B. Integrator 800 may include a correlative integrator, a coarse quantizer, a fine quantizer, and a common mode voltage generator. Integrator 800 may include switches sp1_2, sp0_2, sp1_1, sp1_0, sp0_1, and sp1_0, a comparator, DAC logic, and a counter to perform coarse quantization of the pixel capacitance. The DAC control logic also controls switches sn1_2, sn0_2, sn1_1, sn1_0, sn1_0, and sn0_0 that together with the coarse quantizer switches perform fine quantization.

Figure 9A:
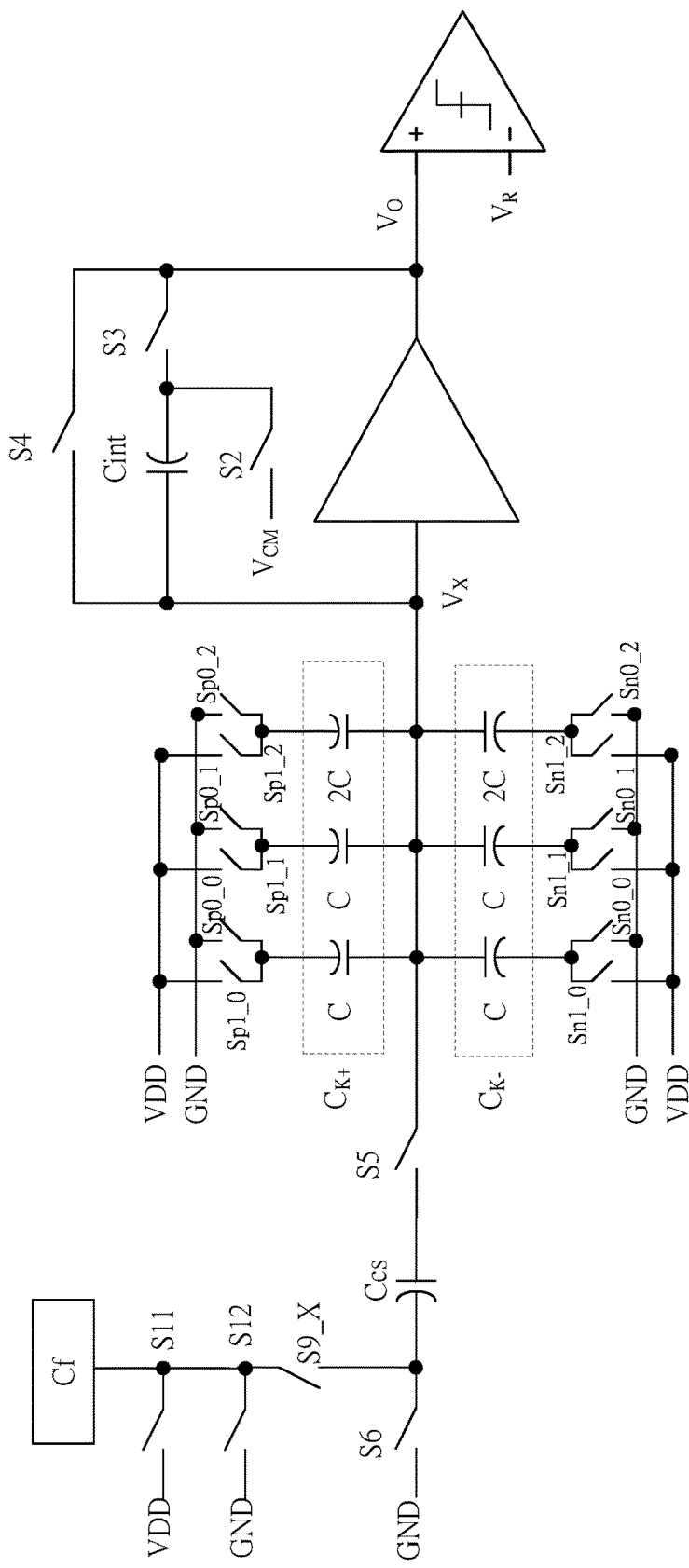
FIG. 9A is a schematic diagram illustrating the second capacitance detecting circuit, in accordance with some example embodiments.

FIG. 9A is an example schematic diagram illustrating the second capacitance detecting circuit. FIG. 9A also refers to FIG. 8B. Cf in FIG. 9A may be expressed as Cf=Cbase+Csig, where Cf is the total capacitance being determined, Cbase is a base or fixed capacitance, and Csig is a capacitance that is representative of the presence or absence of a fingerprint ridge at the location of the pixel corresponding to Cbase and Csig. In some example embodiments, Cbase may equal or be approximately equal to 10 fF (femtofarads). Continuing the example in FIG. 9A, Csig=0.01 fF, and CK=Cdac=4*C=2*Cbase=20 fF, where C is the capacitance noted in FIG. 9A associated with switches snX_0, snX_1, spX_0, and spX_1 (and twice the quantity of capacitance 2C associated with switches snX_2 and spX_2). When the quantity of integration cycles, N, is set to 10000, the coarse quantization value of the signal may be expressed as Csig*N/CK=0.01 fF*10000/20 fF=5. When the fine ADC is chosen to be 2-bits, the total quantization range (combined coarse and fine) of the signal may be 20 (5*2^2=20). When the output swing is chosen to be (⅓)*VDD, Cint may be chosen to be 3 times of Cdac, that is, Cint=12*C=60 fF.

Figure 9B:
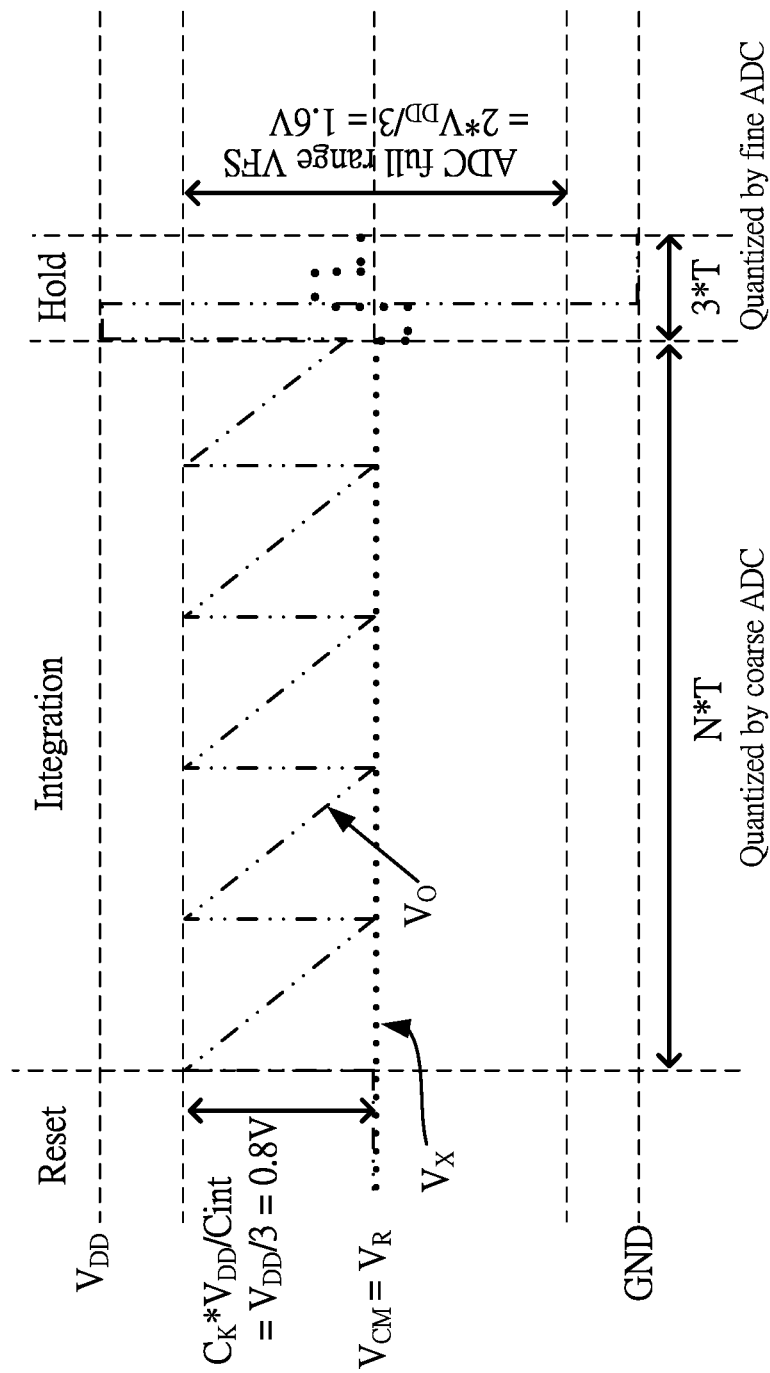
FIG. 9B is a diagram of a waveform of the second capacitance detecting circuit, in accordance with some example embodiments.

FIG. 9B is a diagram of a waveform of the second capacitance detecting circuit. FIG. 9B shows the voltage as a function of time at the points labeled Vx and Vo in FIG. 9A. The voltage plot is related to CK, VDD, Cint, VCM (generated by common mode voltage generator), VR (reference voltage that may be equal to VCM), and GND (ground). Time is quantized by time period T. Each period T may correspond to a clock cycle and/or a cycle of the triangular waveform shown in FIG. 9B.

Figure 10A:
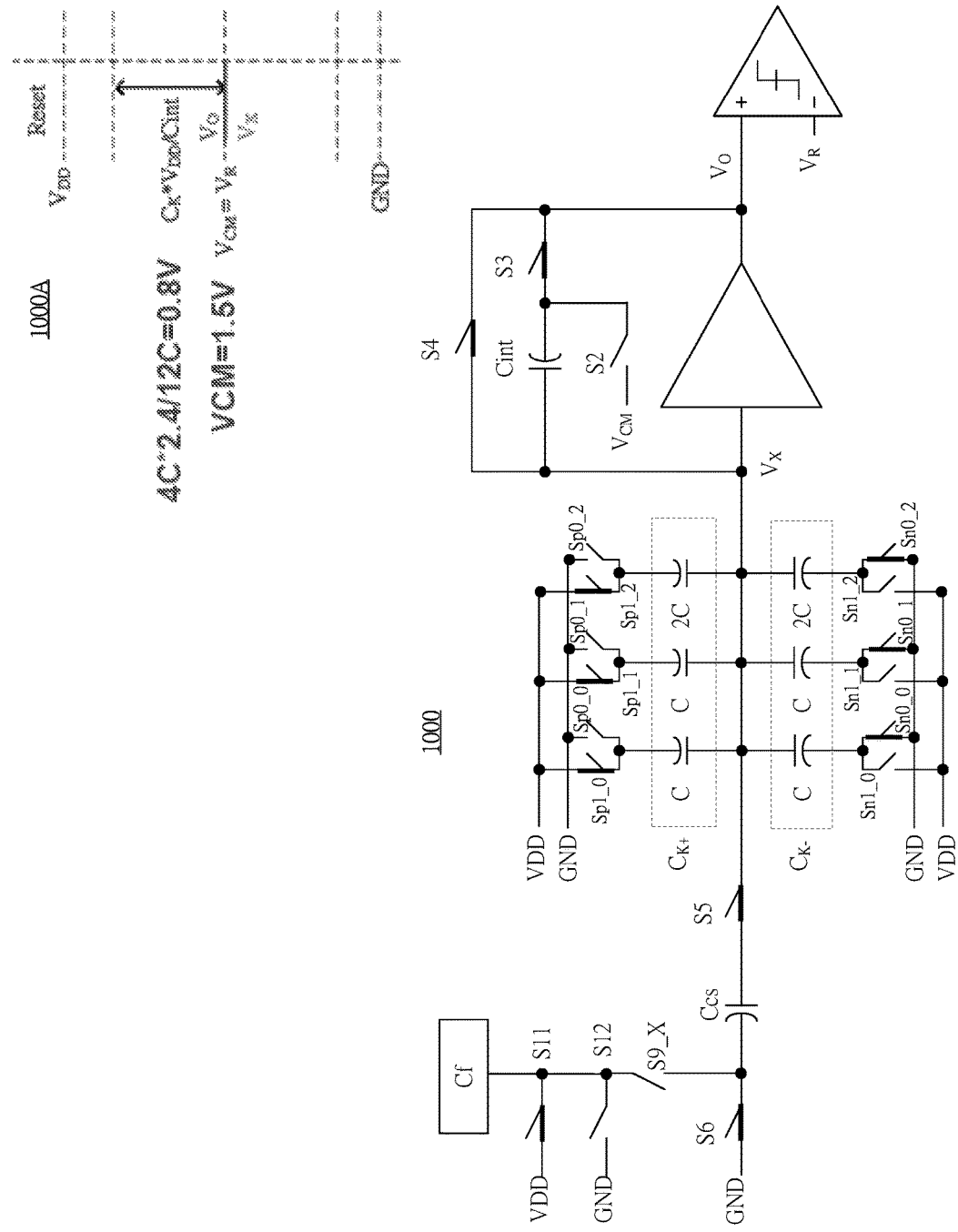
FIGS. 10A-10E are schematic diagrams illustrating the second capacitance detecting circuit in FIG. 9A, in accordance with some example embodiments.

FIG. 10A depicts a schematic diagram 1000 and voltage waveform 1000A illustrating the second capacitance detecting circuit in a reset phase of determining the capacitance of Cf. In the reset phase, switches sp1_0, sp1_1, sp1_2, sn0_0, sn0_1, sn0_2, S11, S6, S5, S3, and S4 are closed, and switches sp0_0, sp0_1, sp0_2, sn1_0, sn1_1, sn1_2, S12, and S2 are open. In some embodiments, the reset phase of the second capacitance detecting circuit operates using the same steps as the reset phase of the first capacitance detecting circuit.

Figure 10B:
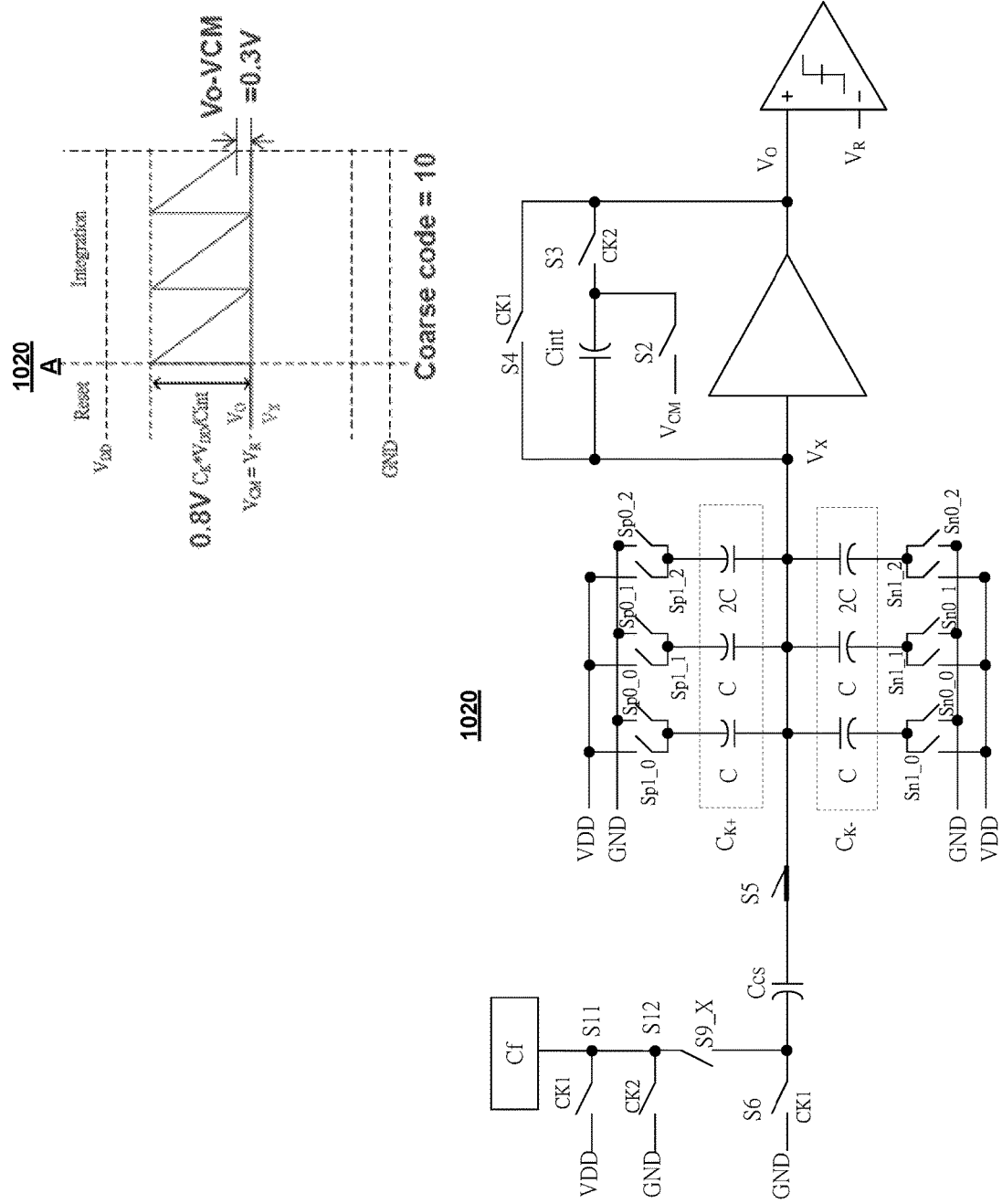

FIG. 10B depicts a schematic diagram 1020 and voltage waveform 1020A illustrating the second capacitance detecting circuit in an integration phase of determining the capacitance of Cf. In some example embodiments, switches sp1_0, sp0_0, sp1_1, sp0_1, sp1_2, and sp0_2 may be operated to produce a coarse ADC value. Switches sn1_0, sn0_0, sn1_1, sn0_1, sn1_2, and sn0_2 may be held open. At the end of the coarse integration phase, the coarse code is determined. In the example shown at 1020A, the coarse code is a binary value of 10. The determined value is 10 rather than 11 because Co-VCM=0.3>0 at the end of the integration phase.

Figure 10C:
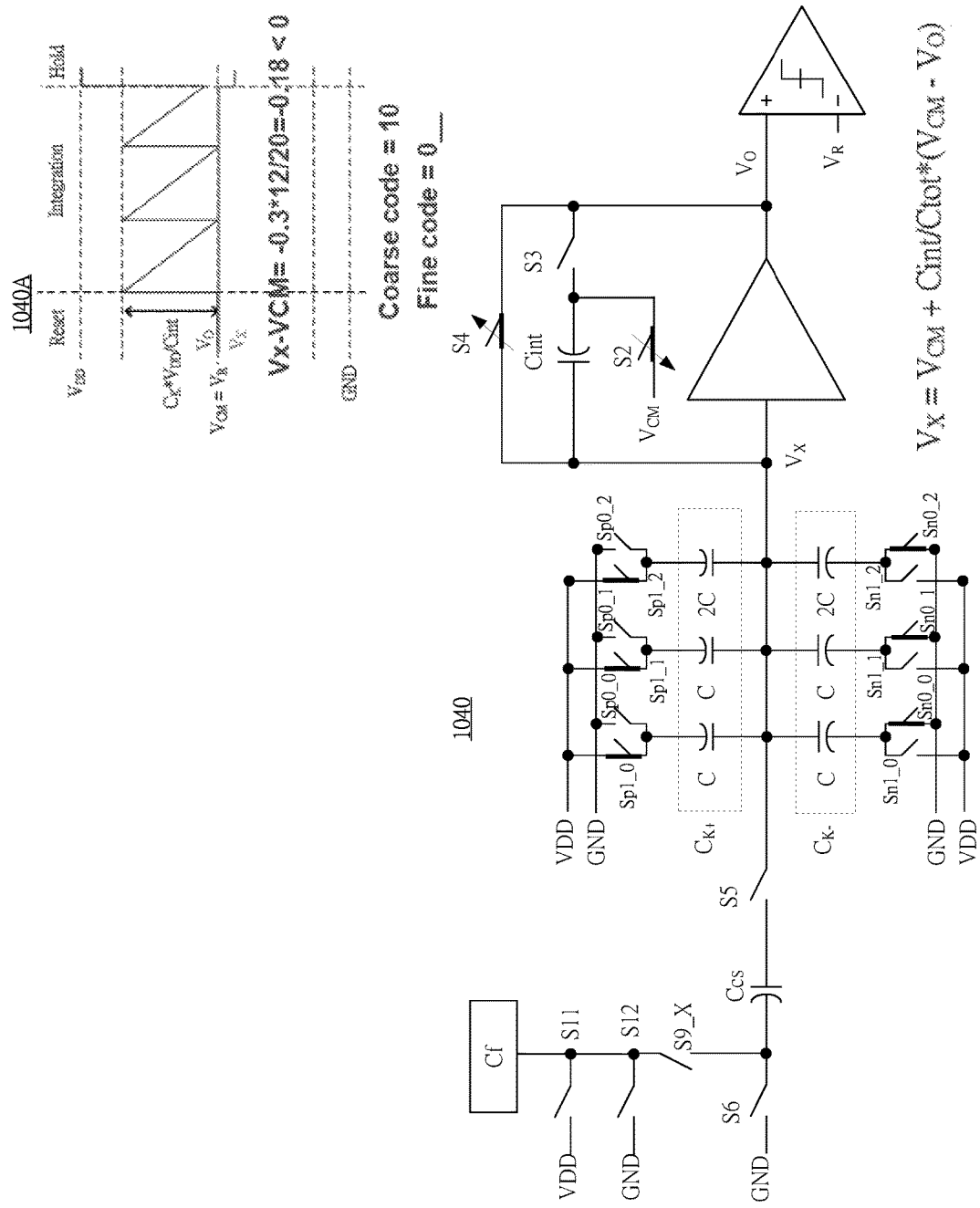

FIG. 10C depicts a schematic diagram 1040 and voltage waveform 1040A illustrating the second capacitance detecting circuit in a first portion of a fine ADC sampling phase. During the fine ADC sampling phase, the quantity representative of capacitance Cf is further refined to a more accurate value than was determined by the coarse ADC value. In some example embodiments, switches sp1_0, sp1_1, sp1_2, sn0_0, sn0_1 and sn0_2, may be closed, and switches sp0_0, sp0_1, sp0_2, sn1_0, sn1_1, sn1_2, and S3 may be open, thereby resetting the CK+ and CK− capacitor arrays. When switch S4 is opened and then switch S2 is closed, the charged stored in capacitor Cint will be redistributed at Vx to the capacitor arrays. In the example shown at 1040A, the most significant fine ADC bit has a 0 value.

Figure 10D:
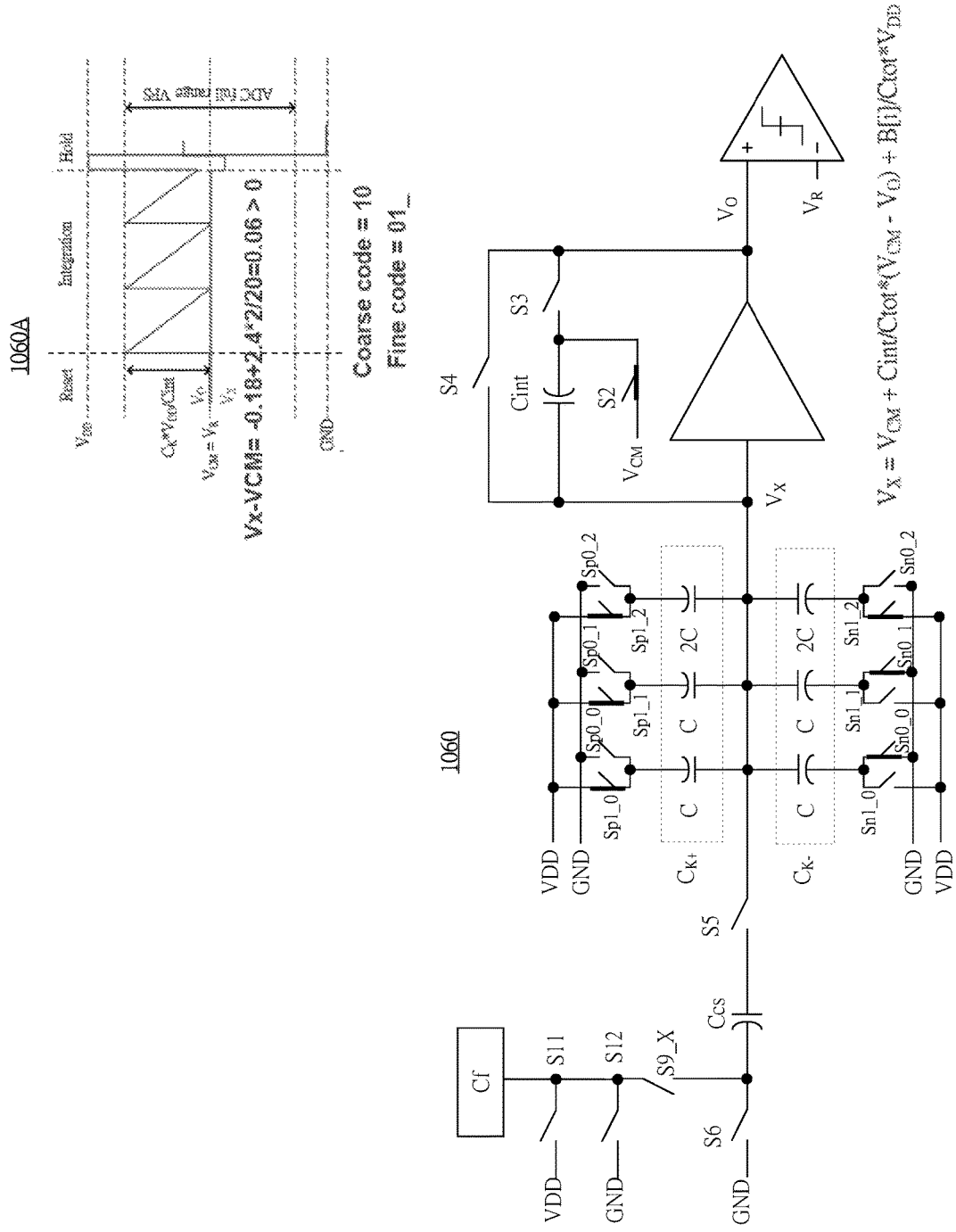

FIG. 10D depicts a schematic diagram 1060 and voltage waveform 1060A illustrating the second capacitance detecting circuit in a second portion of a fine ADC comparing phase. In some example embodiments, switches sp1_0, sp1_1, sp1_2, sn0_0, sn0_1, sn1_2, and S2 may be closed, and switches sp0_0, sp0_1, sp0_2, sn1_0, sn1_1, sn0_2, S11, S12, S6, S5, S4, and S3 may be open. In the example shown at 1060A, at the end of the second portion of a fine ADC sampling phase, the next bit less significant in the fine ADC value is determined to have a 1 value.

Figure 10E:
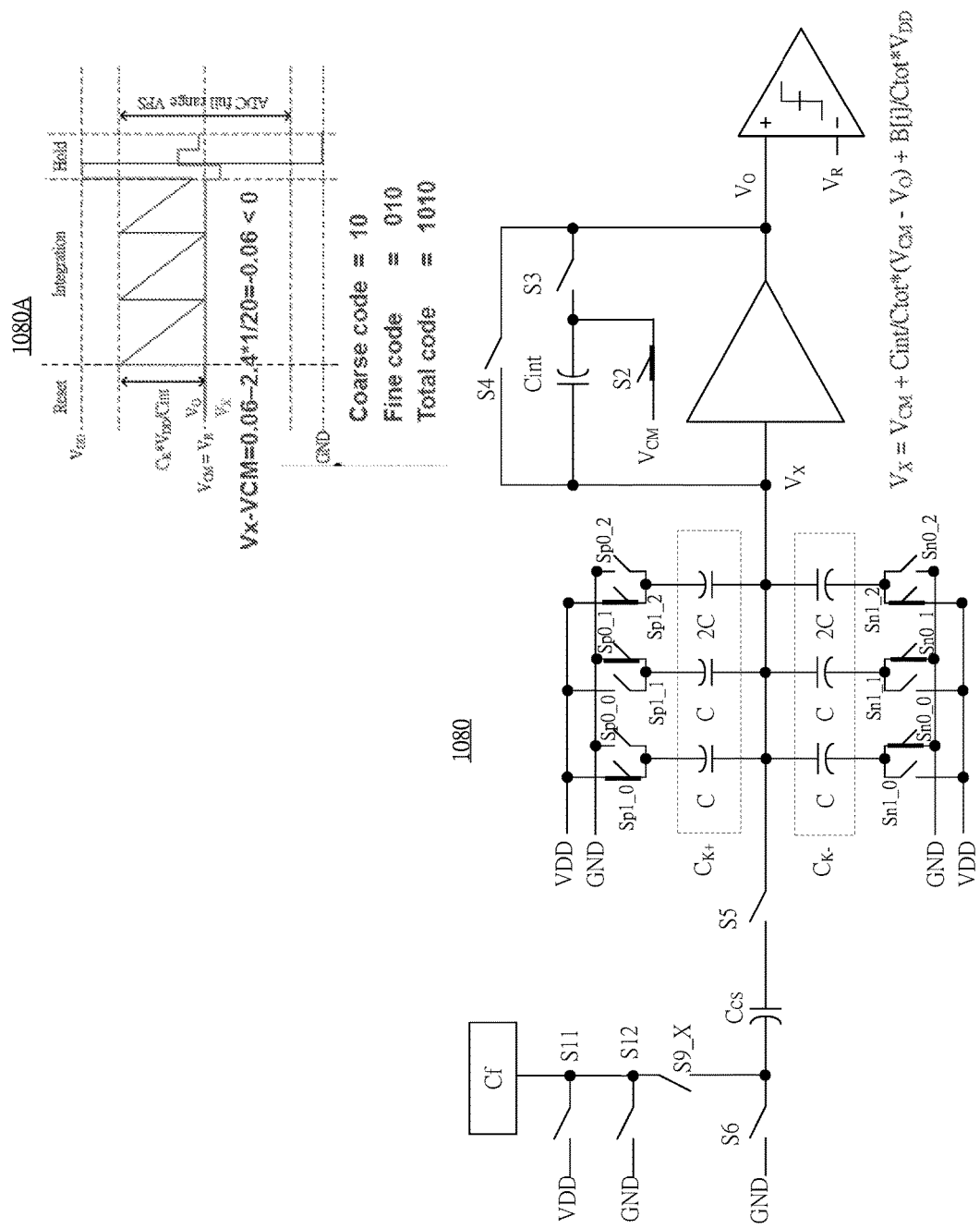

FIG. 10E depicts a schematic diagram 1080 and voltage waveform 1080A illustrating the second capacitance detecting circuit in a third portion of a fine ADC comparing phase. In some example embodiments, switches sp1_0, sp0_1, sp1_2, sn0_0, sn0_1, sn1_2, and S2 may be closed, and switches, sp0_0, sp1_1, sp0_2, sn1_0, sn1_1, sn0_2, S11, S12, S6, S5, S4, and S3 may be held open. At the end of the third portion of a fine ADC comparing phase, the next less significant bit in the fine ADC value is determined to have a 0 value. In some embodiments, the coarse and fine ADC values may be combined. In the example shown at 1080A, the least significant bit of the coarse ADC value overlaps the most significant bit on the fine ADC value. Accordingly, in the example at 1080A, the full quantized value is 1010.

Figure 11:
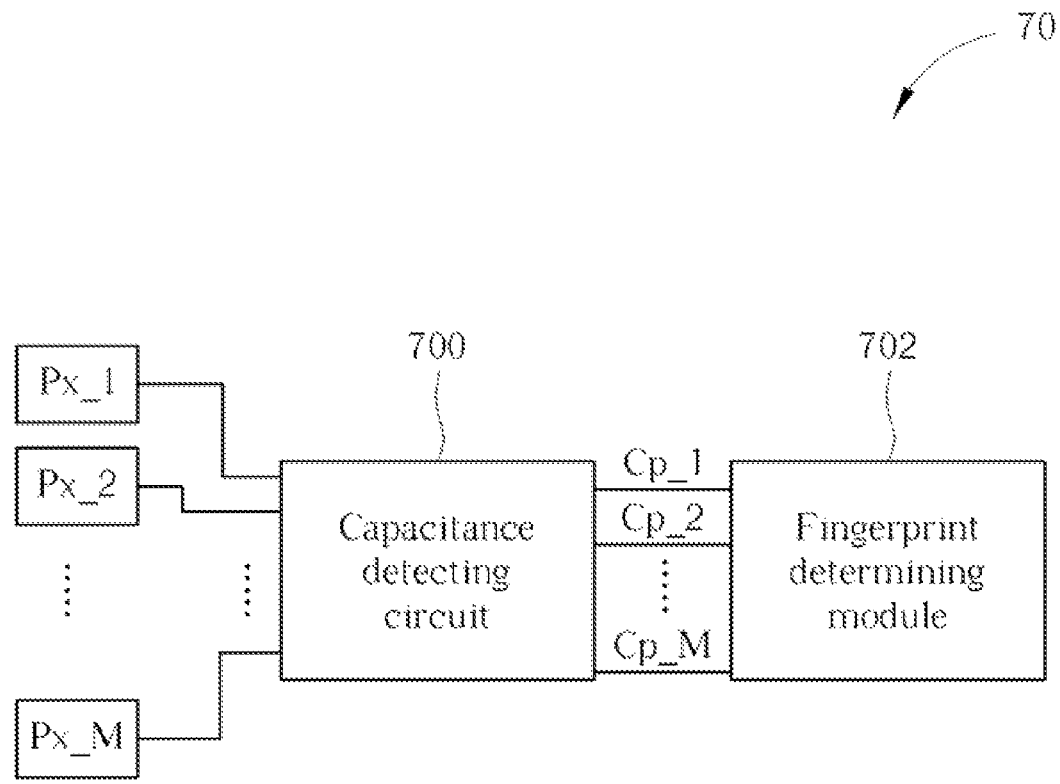
FIG. 11 is a schematic diagram of a fingerprint identification system, in accordance with some example embodiments.

FIG. 11 is a schematic diagram of an exemplary fingerprint identification system 70. The fingerprint identification system 70 includes pixel sensing circuit Px_1, Px_2, . . . , Px_M, a capacitance detecting circuit 700, and a fingerprint determining module 702. Each of the pixel sensing circuit Px_1, Px_2, . . . , Px_M may be the same as the pixel sensing circuit 108. The capacitance detecting circuit 700 may be substantially the same as either the capacitance detecting circuit 10, the capacitance detecting circuit 50, and/or the capacitance detecting circuit shown in FIGS. 8A-10E. The pixel sensing circuit Px_1, Px_2, . . . , Px_M are coupled to the capacitance detecting circuit 700 to detect the capacitance of the capacitor Cf. The capacitance detecting circuit 700 may generate capacitance outputs Cp_1, CP_2, . . . , Cp_M corresponding to the pixel sensing circuit Px_1, Px_2, . . . , Px_M and send the capacitance outputs Cp_1, CP_2, . . . , Cp_M to the fingerprint determining module 702. The capacitance outputs Cp_1, CP_2, . . . , Cp_M may be counter outputs Vo_cnt_1-Vo_cnt_M or overall outputs Vout_1-Vout_M generated by the capacitance detecting circuit 700 corresponding to each of the pixel sensing circuit Px_1, Px_2, . . . , Px_M. The fingerprint determining module 702 can determine the location of each of the pixel sensing circuit Px_1, Px_2, . . . , Px_M corresponding to a finger ridge or a finger valley according to the corresponding capacitance output.

In the capacitance detecting circuit 10, the capacitance detecting circuit 50, and the capacitance detecting circuit shown in FIGS. 8A-10E a capacitance value of the capacitor Cf formed by the user's finger in the pixel sensing circuit 108 is extremely small in reality. A capacitance value of the capacitor C1 is usually chosen to be much larger than the capacitance value of the capacitor Cf, such that the capacitor C1 is able to absorb most of the charges stored in the capacitor Cf and the integrating output voltage Vpo would be more significant. The concept of using the capacitor C1 with large capacitance to absorb charges stored in the capacitor Cf may be applied to a capacitance detecting circuit using an integrator including an operational amplifier.

A capacitance detecting circuit based on the disclosed technology can be used to control the ON-OFF statuses or states of the switches connected to the capacitor according to the comparing output voltage, so as to restrict the integrating output voltage to remain within a specific range. The specific range corresponds to the linear operating region of the circuit. Therefore, the integrating output voltage is maintained within the linear operating region. Furthermore, the capacitance detecting circuit of the disclosed technology utilizes the single-ended amplifiers, so as to lower the noise in the circuit and further enhance the SNR of the circuit.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A capacitance detecting circuit, comprising:
a pixel sensing circuit that includes a sensing conducting layer that interfaces with an object to form a capacitance with the object;
a first capacitor coupled to the pixel sensing circuit;
an integrator electrically coupled to the first capacitor and configured to generate an integrating output voltage, the integrator including:
a first single-ended amplifier, including:
an integrating output terminal configured to output the integrating output voltage, and
a first input terminal coupled to the first capacitor, and
at least one integration capacitor coupled to the first input terminal;
a comparator coupled to the integrating output terminal of the first single-ended amplifier and configured to generate a comparing output voltage indicative of the capacitance between the sensing conducting layer and the object;
a first switch coupled to the first capacitor to a ground;
a second capacitor;
a second switch between the second capacitor and the first input terminal of the integrator, wherein the second switch is configured to turn on and off based on the comparing output voltage from the comparator to provide an electrical connection between the second capacitor and the integrator.

2. The capacitance detecting circuit of claim 1, wherein the comparator includes:
a negative input terminal coupled to the integrating output terminal of the first single-ended amplifier;
a positive input terminal configured to receive a reference voltage; and
a comparing output terminal configured to output the comparing output voltage.

3. The capacitance detecting circuit of claim 2, comprising:
a counter coupled to the comparing output terminal and configured to generate a counter output.

4. The capacitance detecting circuit of claim 1, comprising:
a third switch to couple the second capacitor to a voltage generator; and
a fourth switch to couple the second capacitor to a ground, wherein the second switch and the fourth switch are controlled to be ON when the comparing output indicates that the integrating output voltage is smaller than the reference voltage.

5. The capacitance detecting circuit of claim 1, wherein the integrator further comprises:
a reset switch coupled between the first input terminal and the integrating output terminal,
wherein the reset switch is controlled to conduct an electrical connection between the first input terminal and the integrating output terminal.

6. The capacitance detecting circuit of claim 1, wherein the integrator comprises at least one integrating switching unit coupled between the at least one integration capacitor and the integrating output terminal.

7. The capacitance detecting circuit of claim 1, wherein the pixel sensing circuit comprises:
a second conducting layer formed below the sensing conducting layer to form a capacitance with the sensing conducting layer.

8. A system equipped with a fingerprint sensor, comprising:
a fingerprint sensor to capture a portion of a user's fingerprint pattern based on capacitive sensing, the fingerprint sensor including a capacitance detecting circuit as in claim 1;
a fingerprint processing processor coupled to receive information of a user fingerprint captured by the fingerprint sensor to determine whether the captured user fingerprint is from an authorized user; and
a device coupled to the fingerprint processing processor, wherein an access to the device is controlled by the fingerprint processor based on whether the captured user fingerprint is from an authorized user.

9. A capacitance detecting circuit, comprising:
a pixel sensing circuit that includes a sensing conducting layer that interfaces with an object to form a capacitance with the object;
a first capacitor coupled to the pixel sensing circuit;
an integrator electrically coupled to the first capacitor and configured to generate an integrating output voltage, the integrator including:
a first single-ended amplifier, including:
an integrating output terminal configured to output the integrating output voltage, and
a first input terminal coupled to the first capacitor, and
at least one integration capacitor coupled to the first input terminal; and
a comparator coupled to the integrating output terminal of the first single-ended amplifier and configured to generate a comparing output voltage indicative of the capacitance between the sensing conducting layer and the object;
wherein the integrator further comprises at least one integrating switching unit coupled between the at least one integration capacitor and the integrating output terminal, and
wherein the at least one integrating switching unit is coupled to a voltage generator or a ground.

10. The capacitance detecting circuit of claim 9, wherein the first capacitor is coupled to a ground via a first switch.

11. The capacitance detecting circuit of claim 9, wherein the at least one integrating switching unit is configured to selectively conduct electrical connections between the at least one integration capacitor and the integrating output terminal, connections between the at least one integration capacitor and the voltage generator, or connections between the at least one integration capacitor and the ground.

12. The capacitance detecting circuit of claim 9, wherein the comparator includes:
   a negative input terminal coupled to the integrating output terminal of the first single-ended amplifier;
   a positive input terminal configured to receive a reference voltage; and
   a comparing output terminal configured to output the comparing output voltage.

13. The capacitance detecting circuit of claim 12, comprising:
   a counter coupled to the comparing output terminal and configured to generate a counter output.

14. The capacitance detecting circuit of claim 9, wherein the integrator further comprises:
   a reset switch coupled between the first input terminal and the integrating output terminal,
   wherein the reset switch is controlled to conduct an electrical connection between the first input terminal and the integrating output terminal.

15. The capacitance detecting circuit of claim 9, wherein the pixel sensing circuit comprises:
   a second conducting layer formed below the sensing conducting layer to form a capacitance with the sensing conducting layer.

16. A system equipped with a fingerprint sensor, comprising:
   a fingerprint sensor to capture a portion of a user's fingerprint pattern based on capacitive sensing, the fingerprint sensor including a capacitance detecting circuit as in claim 9;
   a fingerprint processing processor coupled to receive information of a user fingerprint captured by the fingerprint sensor to determine whether the captured user fingerprint is from an authorized user; and
   a device coupled to the fingerprint processing processor, wherein an access to the device is controlled by the fingerprint processor based on whether the captured user fingerprint is from an authorized user.

17. The system as in claim 16, wherein the device coupled to the fingerprint processing processor includes a smart phone, a portable device, a database system, a computer system, or an automobile.

18. A capacitance detecting circuit, comprising:
   a pixel sensing circuit that includes a sensing conducting layer that interfaces with an object to form a capacitance with the object;
   a first capacitor coupled to the pixel sensing circuit;
   an integrator electrically coupled to the first capacitor and configured to generate an integrating output voltage, the integrator including:
      a first single-ended amplifier, including:
         an integrating output terminal configured to output the integrating output voltage, and
         a first input terminal coupled to the first capacitor, and
      at least one integration capacitor coupled to the first input terminal;
   a comparator coupled to the integrating output terminal of the first single-ended amplifier and configured to generate a comparing output voltage indicative of the capacitance between the sensing conducting layer and the object;
   wherein the integrator further comprises at least one integrating switching unit coupled between the at least one integration capacitor and the integrating output terminal; and
   a common mode voltage generator configured to generate a common mode voltage, the common mode voltage generator comprising:
      a second single-ended amplifier comprising:
         a second input terminal; and
         a second output terminal coupled to be a part of the at least one integrating switching unit and the second input terminal via a connecting switch; and
      a plurality of common mode capacitors coupled to the second input terminal.

19. The capacitance detecting circuit of claim 18, wherein the common mode voltage generator further comprises a plurality of common mode switching units coupled between the plurality of common mode capacitors and the second output terminal.

20. The capacitance detecting circuit of claim 19, wherein the plurality of common mode switching units are coupled to a voltage generator or a ground.

21. The capacitance detecting circuit of claim 20, wherein the plurality of common mode switching units are controlled to selectively conduct connections between the plurality of common mode capacitors and the second output terminal, connections between the plurality of common mode capacitors and the voltage generator, or connections between the plurality of common mode capacitors and the ground.

22. The capacitance detecting circuit of claim 18, further comprising an analog to digital converter (ADC) coupled to the integrating output terminal and the second output terminal and configured to generate an ADC output.

23. The capacitance detecting circuit of claim 22, wherein the capacitance detecting circuit is configured to generate an overall output by combining the counter output and the ADC output.

24. A system equipped with a fingerprint sensor, comprising:
   a fingerprint sensor to capture a portion of a user's fingerprint pattern based on capacitive sensing, the fingerprint sensor including a capacitance detecting circuit as in claim 18;
   a fingerprint processing processor couple to receive information of a user fingerprint captured by the fingerprint sensor to determined whether the captured user fingerprint is from an authorized user; and
   a device coupled to the fingerprint processing processor, wherein an access to the device is controlled by the fingerprint processor based on whether the captured user fingerprint is from an authorized user.

25. The system as in claim 24, wherein the device coupled to the fingerprint processing processor includes a smart phone, a portable device, a database system, a computer system, or an automobile.

26. A fingerprint identification system, comprising:
   a plurality of pixel sensing circuits at different locations to interface with a finger to capture at least a portion of a fingerprint of the finger;
   a capacitance detecting circuit coupled to the plurality of pixel sensing circuits and configured to generate a plurality of capacitance outputs corresponding to the plurality of pixel sensing circuits, the capacitance detecting circuit comprising:
      a first capacitor;
      an integrator configured to generate an integrating output voltage, comprising:

a first single-ended amplifier, comprising:
an integrating output terminal configured to output the integrating output voltage; and
a first input terminal coupled to the first capacitor; and
at least one integration capacitor coupled to the first input terminal;
a second capacitor;
a comparator configured to generate a comparing output, the comparator comprising:
a negative input terminal coupled to the integrating output terminal of the first single-ended amplifier;
a positive input terminal configured to receive a reference voltage; and
a comparing output terminal configured to output the comparing output; and
a counter coupled to the comparing output terminal and configured to generate a plurality of counter outputs corresponding to the plurality of pixel sensing circuits as the plurality of capacitance outputs; and
a fingerprint determining module coupled to the capacitance detecting circuit and configured to determine a location of each pixel sensing circuit corresponding to a finger ridge or a finger valley based on the corresponding capacitance output;
wherein a connection between the second capacitor and the first input terminal is controlled to be turned ON or OFF based on the comparing output.

27. The fingerprint identification system of claim 26, comprising:
a first switch to couple the first capacitor to a ground.

28. The fingerprint identification system of claim 26, comprising:
a second switch to couple the second capacitor to the first input terminal;
a third switch to couple the second capacitor to a voltage generator; and
a fourth switch to couple the second capacitor to a ground;
wherein the second switch and the fourth switch are controlled to be turned ON when the comparing output indicates that the integrating output voltage is smaller than the reference voltage.

29. The fingerprint identification system of claim 28, wherein each pixel sensing circuit comprises:
a first conducting layer coupled to a voltage generator via a fifth switch and a ground via a sixth switch; and
a second conducting layer coupled to the voltage generator via a seventh switch and the first capacitor via an eighth switch.

30. The fingerprint identification system of claim 26, wherein the integrator further comprises:
a reset switch coupled between the first input terminal and the integrating output terminal,
wherein the reset switch is controlled to conduct a connection between the first input terminal and the integrating output terminal.

31. The fingerprint identification system of claim 26, wherein the integrator comprises:
at least one integrating switching unit coupled between the at least one integration capacitor and the integrating output terminal.

32. The fingerprint identification system of claim 31, wherein the at least one integrating switching unit is coupled to a voltage generator or a ground.

33. The fingerprint identification system of claim 32, wherein the at least one integrating switching unit is controlled to selectively conduct connections between the at least an integration capacitor and the voltage generator, or connections between the at least an integration capacitor and the ground.

34. The fingerprint identification system of claim 33, further comprising a common mode voltage generator to generate a common mode voltage, the common mode voltage generator comprising:
a second single-ended amplifier comprising:
a second input terminal; and
a second output terminal coupled to a part of the at least one integrating switching units and the second input terminal via a connecting switch; and
a plurality of common mode capacitors coupled to the second input terminal.

35. The fingerprint identification system of claim 34, wherein the common mode voltage generator further comprises a plurality of common mode switching units coupled between the plurality of common mode capacitors and the second output terminal.

36. The fingerprint identification system of claim 35, wherein the plurality of common mode switching units are coupled to a voltage generator or a ground.

37. The fingerprint identification system of claim 36, wherein the plurality of common mode switching units are controlled to selectively conduct connections between the plurality of common mode capacitors and the second output terminal, connections between the plurality of common mode capacitors and the voltage generator, or connections between the plurality of common mode capacitors and the ground.

38. The fingerprint identification system of claim 34, further comprising an analog to digital converter (ADC) coupled to the integrating output terminal and the second output terminal and configured to generate a plurality of ADC outputs.

39. The fingerprint identification system of claim 38, wherein the capacitance detecting circuit generates a plurality of overall outputs as the plurality of capacitance outputs by combining the plurality of counter outputs and the plurality of ADC outputs.

40. A capacitance detecting circuit, comprising:
a first capacitor, comprising a first end coupled to a pixel sensing circuit and a second end;
an integrator;
a first switch coupled between the first end of the first capacitor and a ground;
a second switch coupled between the second end of the first capacitor and the integrator; and
a conducting layer coupled to the voltage generator via a fifth switch and the first capacitor via a sixth switch.

41. The capacitance detecting circuit of claim 40, wherein the pixel sensing circuit comprises:
another conducting layer coupled to a voltage generator via a third switch and the ground via a fourth switch.

42. The capacitance detecting circuit of claim 41, wherein the integrator comprises:
an amplifier comprising:
a positive input terminal configured to received the reference voltage;
a negative input terminal coupled to the second switch; and
an output terminal;
an integrating capacitor, coupled between the negative input terminal and the output terminal of the amplifier; and
a reset switch, coupled between the negative input terminal and the output terminal of the amplifier.

43. A capacitance detecting circuit, comprising:
a pixel sensing circuit that interfaces with an object to form a capacitance with the object;
a first capacitor, coupled to the pixel sensing circuit;
an integrator electrically coupled to the first capacitor and configured to generate an integrating output voltage, the integrator including:
a first single-ended amplifier, including:
an integrating output terminal configured to output the integrating output voltage, and
a first input terminal coupled to the first capacitor, and
at least one integration capacitor coupled to the first input terminal;
an array of capacitors, one terminal of each capacitor in the array being switched to a predetermined voltage or switched open; and
a comparator coupled to the integrating output terminal of the first single-ended amplifier and configured to generate a comparing output voltage indicative of the capacitance between the pixel sensing circuit and the object.

44. The capacitance detecting circuit of claim 43, wherein the comparator includes:
a negative input terminal coupled to the integrating output terminal of the first single-ended amplifier;
a positive input terminal configured to receive a common mode voltage; and
a comparing output terminal configured to output the comparing output voltage.

45. The capacitance detecting circuit of claim 44, comprising:
a counter coupled to the comparing output terminal and configured to generate a counter output.

46. The capacitance detecting circuit of claim 43, wherein the first capacitor is coupled to a ground via a first switch.

47. The capacitance detecting circuit of claim 43, wherein the other terminal of each capacitor in the array of capacitors is connected to
a VDD switch to couple the other terminal to a voltage generator; and
a ground switch to couple the other terminal to a ground, wherein the VDD switch and the ground switch are controlled to be ON when the comparing output indicates that the integrating output voltage is smaller than the reference voltage.

48. The capacitance detecting circuit of claim 43, wherein the integrator further comprises:
a reset switch coupled between the first input terminal and the integrating output terminal,
wherein the reset switch is controlled to conduct an electrical connection between the first input terminal and the integrating output terminal.

49. The capacitance detecting circuit of claim 43, further comprising a common mode voltage generator configured to generate the common mode voltage, the common mode voltage generator comprising:
a second singled-ended amplifier comprising:
a second input terminal; and
a second output terminal coupled to a part of the at least one integrating switching unit and the second input terminal via a connecting switch; and
a plurality of common mode capacitors coupled to the second input terminal.

50. The capacitance detecting circuit of claim 43, wherein the array of capacitors is configured to provide a course quantization of the detected capacitance and a fine quantization of the detected capacitance.

51. The capacitance detecting circuit of claim 50, wherein the capacitance detecting circuit is configured to generate an overall output by combining the course quantization and the fine quantization of the capacitance.

52. The capacitance detecting circuit of claim 43, wherein the pixel sensing circuit comprises:
a first top conducting layer that interfaces with the object to form the capacitance with the object to be measured and coupled to a voltage generator via a first switch and a ground via a second switch; and
a second conducting layer formed below the first top conducting layer to form a capacitance with the first top conducting layer and coupled to the voltage generator via a third switch and the first capacitor via a fourth switch.

53. The system as in claim 8, wherein the device coupled to the fingerprint processing processor includes a smart phone, a portable device, a database system, a computer system, or an automobile.

* * * * *